United States Patent [19]
Miura et al.

[11] Patent Number: 5,689,719
[45] Date of Patent: Nov. 18, 1997

[54] PARALLEL COMPUTER SYSTEM INCLUDING PROCESSING ELEMENTS

[75] Inventors: Hiroki Miura, Takatsuki; Yasuhito Koumura, Nara, both of Japan

[73] Assignee: Sanyo Electric O., Ltd., Moriguchi, Japan

[21] Appl. No.: 907,926

[22] Filed: Jun. 29, 1992

[30] Foreign Application Priority Data

| Jun. 28, 1991 | [JP] | Japan | 3-158790 |
| Jul. 2, 1991 | [JP] | Japan | 3-161781 |
| Oct. 31, 1991 | [JP] | Japan | 3-286078 |

[51] Int. Cl.$^6$ .................................................. G06F 15/00
[52] U.S. Cl. ..................... 39/800; 355/200.15; 370/406
[58] Field of Search ......................... 395/800, 325, 395/200, 375, 650, 275, 200.15, 200.16, 406, 824, 309, 306, 311, 379; 364/716, 491, 221; 370/406

[56] References Cited

U.S. PATENT DOCUMENTS

| 4,992,933 | 2/1991 | Taylor | 395/800 |
| 5,165,023 | 11/1992 | Gifford | 395/325 |
| 5,305,462 | 4/1994 | Grondalski | 395/800 |
| 5,341,504 | 8/1994 | Mori et al. | 395/800 |
| 5,388,235 | 2/1995 | Ikenaga et al. | 395/375 |
| 5,408,646 | 4/1995 | Olnowich et al. | 395/575 |

*Primary Examiner*—Larry D. Donaghue
*Attorney, Agent, or Firm*—Darby & Darby

[57] ABSTRACT

A parallel computer system includes a plurality of processing elements each comprising a network control unit. The network control unit of the processing element has ports to north, east, west and south, and row directional communication lines and column directional communication lines are connected to each port forming a taurus mesh network. Each processing element operates in two communication control modes, in a bi-directional communication mode or in a unidirectional communication mode. In the bi-directional communication mode, the network control unit permits eastward and westward transmission of data through the row directional communication lines and northward and southward transmission of data through the column directional communication lines. In the unidirectional communication mode, only the one way data transmission from west to east is permitted in the row directional communication lines, and only the one way data transmission from north to south is permitted in the column directional communication lines.

25 Claims, 13 Drawing Sheets

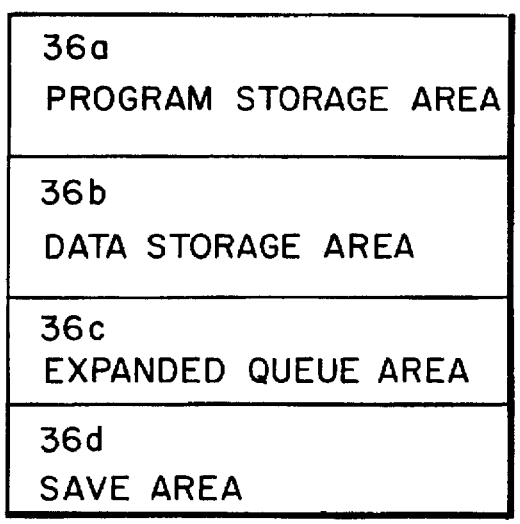

PARALLEL COMPUTER SYSTEM INCLUDING PROCESSING ELEMENTS

BACKGROUND OF THE INVENTION

2. Field of the Invention

The present invention relates to a parallel computer system including processing elements and, in particular, to a parallel computer system including a plurality of processing elements and for performing data transmissions among the processing elements.

2. Description of the Prior Art

In recent years much research has been conducted toward the realization of practical parallel computer systems. Especially, with the advancement of the semiconductor technology, a communication control unit and a data processing unit can now be realized as a processing element on a single LSI chip, and there are a number of proposed systems where a parallel computer is realized by connecting a number of such processing element LSIs.

An example of such a parallel computer, a large-scale data-flow computer named EDDEN (Enhanced Data Driven ENgine) having maximum of 1024 one-chip processing elements connected, is currently under development as disclosed in pages 1048–1049 of the book 2T-2 of the Proceeds-angus of 38th conference of Information Processing Society. In such a large-scale data-flow computer, all the communications among processing elements are bi-directional, and the distance between any two processing elements in such data communication can be made minimized.

Furthermore, it has been proposed to use bi-directional parallel communication lines for communication links connecting processing elements, for this would make it possible to use the same communication link for both transmitting and receiving of data and would reduce the number of signal lines used to connect processing elements in a large-scale data-flow computer.

As done in the EDDEN system above, the implementation of the bi-directional communication among the processing elements can not only improve communication efficiency but can also maintain the uniformity of the communication network. Furthermore, by having transmissions in both directions share the same communication line, the number of input/output terminals of a processing element can be reduced, and a processing element can then be realized on a single LSI chip.

In a conventional parallel computer, when a packet consisting of a plurality of words is being transmitted in one direction, there occurs a state where the packet may exist over multiple processing elements. If another packet being transmitted to the opposite direction is similarly existent over multiple processing elements, both packets would come to a halt to wait for the completion of the other packet's transmission. Therefore, a deadlock in which the both packets will never be able to move again occurs.

Such a deadlock can be avoided by equipping each processing element with a data buffer having a size equivalent to the number of words in a packet. This will cause one entire packet to be stored within the data buffer of a processing element and will avoid the spreading out of a packet over multiple processing elements as mentioned before. In other words, if the number of words in a packet is fixed, deadlocks can be avoided by equipping each processing unit with a data buffer whose size is equivalent to the number of words in a packet.

However, when a structure packet, e.g., a one-dimensional vector, having large number of words of variable sizes are transmitted between processing elements, the above-mentioned deadlock cannot be avoided even when each of the processing elements is equipped with the data buffer as described before. This is because when the number of words in a structure packet exceeds the size of the data buffer in each of the processing elements, a packet again becomes spread out over multiple processing elements.

SUMMARY OF THE INVENTION

Accordingly, it is an object of the present invention to provide a novel parallel computer system employing a plurality of processing elements.

It is a further object of the invention to provide a parallel computer system which avoids deadlocks in transmitting packets having varying number of words as in the case with structure packets.

It is a further object of the invention to provide a parallel computer system in which the internal status of each processing element can be easily examined from the outside, e.g., from a host computer.

It is a further object of the invention to provide a parallel computer system in which the internal status of each processing element can be easily examined without causing increase in the circuit size.

It is a further object of the invention to provide a parallel computer system in which any particular component of a processing element can be set to a specific state with a fewer number of control lines.

It is a further object of the invention to provide a parallel computer system in which any particular component of a processing element is set to a specific state.

It is a further object of the invention to provide a parallel computer system which can connect neighboring processing elements with the least possible number of signal lines.

It is a further object of the invention to provide a parallel computer system whose processing elements transmit and receive bit parallel data at high speed through signal lines.

In a parallel computer system according to the present invention, a processing element has at least four communication ports, designated as directed east, west, south and north, n rows of processing elements in the east-west direction and m columns of processing elements in the south-north direction arranged in such a way as to form an array of n×m processing elements. The system transmits data among processing elements through a plurality of east-west communication lines which cyclically link a row of processing elements in the east-west direction and through a plurality of north-south communication lines which cyclically link a column of processing elements in the north-south direction. Each of the processing elements is set to operate either in a bi-directional communication mode or in a unidirectional communication mode by a control signal from the outside.

When all the processing elements are set to operate in the bi-directional communication mode, east to west data transmission and west to east data transmission through east-west communication lines, and north to south data transmission and south to data transmission through north-south communication lines are permitted. When processing elements are set to operate in the unidirectional communication mode, only the west to east data transmission is permitted through east-west communication line, and only the north to south data transmission is permitted through north-south communication lines.

More specifically, each of the processing elements is identified by a unique processing element number, and the data in transmission must at least have the addressed processing element's number. When data arrives at an processing element via any one of the above mentioned communication ports, the addressed processing element's number is compared with the processing element number of the processing element receiving the data. If both processing element numbers match with each other, the data is processed in the processing element which received the data. If the numbers do not match and if the bi-directional communication control mode is set, the data is selectively sent to one of the four communication ports. If the numbers do not match and if the unidirectional communication control mode is set, the data is selectively sent either to the east communication port or to the south communication port.

Furthermore, when data which need to be transmitted to another processing element is generated within a processing element, in the bi-directional communication mode, the data is selectively sent to one of the four communication ports based on the addressed processing element's number and the processing element number of the processing element which generated the data, or in the unidirectional communication mode, the data is selectively sent either to the east communication port or to the south communication port based on the addressed processing element's number and the processing element number of the processing element which generated the data.

According to the present invention, the deadlock caused by the bi-directional communication can be avoided by changing communication modes of the processing elements in relation with the kind of data to be transmitted. More particularly, when all of the packets to be transmitted within the system have fixed number of words, all the processing elements are set in the bi-directional communication mode, but when the packets contain a variable number of words, all the processing elements are set in the unidirectional communication mode. This prevents any two packets from being transmitted to opposite directions on the same communication line. Accordingly, the above-mentioned deadlock can be avoided even in a case where packets to be transmitted consist of variable number of words as the structure packets. Thus, deadlocks can be completely eliminated totally independent of the amount of data in a packet.

In one aspect of the present invention, for the packet to be transmitted to the outside of the parallel computer network, a packet only need to have a part of the processing element number of the processing element connected to the output interface. This makes it possible to greatly increase the number of processing elements consisting the system without causing an increase in the data size of the addressed processing element's number.

In this aspect, a parallel computer system forms a processing elements array where a plurality of processing elements each having at least four communication ports to the east, west, south and north are arranged in row-column matrix, and each processing element is identified by a processing element number which contains a row number and a column number for identifying the row and the column within the matrix, and comprises row directional communication lines linking processing elements in a row direction through two communication ports directed in the row direction, and column directional communication lines linking processing elements in a column direction through two communication ports directed in the column direction. Data transmitted through these communication lines has an addressed processing element's number and an external flag indicative of whether or not the data is to be output to the outside of the network. When the external flag which is included in the data which either arrived at the processing unit or is generated at the processing element is in a first state, the network control unit selectively outputs data to one of the communication ports so that the data is transmitted to the processing element which is identified by the destination row and column numbers held by the data.

On the other hand, when the external flag which is included in the data that either arrived at the processing unit or is generated at the processing unit is in a second state, the data is selectively output to one of the communication ports so that the data is transmitted to the processing element which is identified by the data's destination row number and a predetermined column number.

A processing elements array can be considered as one processing elements group, and a plurality of processing elements groups can then be interconnected to perform data transmissions among processing elements. In this case, each processing elements group includes an input/output interface that is connected to at least one of the processing elements identified by an aforementioned predetermined column number in the processing elements array. The destination column number field of the data which is to be output to the outside is used as the field for storing the group number for identifying the destination processing elements group. Accordingly, data is transmitted among the plurality of processing elements groups through the input/output interface according to the group number stored in the group number field.

According to this aspect of the invention, data is transmitted to a predetermined column regardless of the value of the column number field of the destination processing element number of the data which is to be output to the outside of the processing elements array. Accordingly, the destination number field of the processing elements array need have only the destination row number, and the destination column number field can be used freely for other purposes.

It is thus possible to use the column number field as the field for the group number of the destination processing elements group. This can greatly increase the number of processing elements forming a parallel computer system without having to increase the field for specifying the group number.

In a further aspect of this invention, program memory area and data memory area, in addition to extended queue area and save area, are formed within the external data memory which is individually set up at each processing element. Meanwhile, a save request signal is given to the processing elements from the outside, for example, from a host computer. Once the save request signal is given, the processing elements save data existing over pipeline ring in the extended queue area or in the save area. However, if the extended queue area overflows, the data is saved in the save area regardless of the save request signal. The saved data can then be easily read out from the outside, e.g., from a host computer, in the same way as programs and data are read out. Thus, with this aspect of the invention, there is no need to have special hardware for the data saving operation.

In a further aspect of this invention, the internal status of each processing element can be easily examined from the outside by sending out an error status signal indicating an occurrence of an internal error, an execution status signal indicating that the execution unit is busy, or a communication status signal indicating that the communication unit is busy.

Furthermore, if the above described signals are sent out, for example, in the open-drain construction, so that they can be individually connected by wired-OR, the internal status of each processing element can then be easily examined without causing an increase in the size of the peripheral circuit of a parallel computer system consisting of a plurality of processing elements.

In a further embodiment of this invention, a parallel computer system in which a plurality of processing elements are connected comprises: a first conditional signal line which is common to a first group of the processing elements which contain a part of a plurality of processing elements, a second conditional signal line which is common to a second group of the processing elements which contain at least one processing element that is included in a first group of the processing elements, and a signal giving means which gives a specific control signals to each of the processing elements in accordance with signals from a first and a second conditional signal lines.

For example, when a plurality of processing elements are arranged in m×n matrix, m conditional signal lines in row direction and n conditional signal lines in column direction, total of m+n lines, are used. When the row conditional signal and the column conditional signal, which are respectively given from row conditional signal lines and column conditional signal lines, meet certain conditions, the signal applying means sets an applicable group of processing elements to a specific state.

Furthermore, in a case where each processing element has additional $2^k$ units or components and it is desirable to set any particular part of the circuit to a specific state, k additional unit selection lines are added. The corresponding part of the circuit within any particular processing element is set to a specific state by giving binary signals to k unit selection lines. Therefore, even when each of the m×n processing elements in row-column matrix contain $2^k$ units, only (m+n+k) lines, which is the total of row conditional signal lines, column conditional signal lines, and unit selection lines, are necessary.

According to this embodiment, any processing element or any group of processing elements can be set to a certain state with ease and flexibility using substantially fewer number of control lines. Furthermore, with the addition of unit selection lines, any unit in any processing element or in any group of processing elements can be set to a certain state.

In other aspect of the current invention, all the ports of a network control unit which is included in each of the processing elements are realized as bi-directional parallel communication ports. Communication ports of neighboring processing elements are linked by bi-directional parallel communication bus which can be used for both transmitting and receiving data. Furthermore, communication control signal line is implemented between neighboring two communication ports for reporting each other's communication status (waiting for transmission, transmitting, no data for transmission, or the like). When transmitting data to a neighboring processing element from a network control unit, first, before the arrival of the transmission data at the communication port, whether to allow transmission to a neighboring processing element is decided, and then, at the same time as the data being transmitted arrives at the communication port, the direction of the bi-directional parallel communication bus linking two communication ports is decided. As the result, data held by one of two communication ports is output to the bi-directional communication bus.

According to the parallel computer system of this embodiment, number of signal lines used in communication links can be drastically reduced because communication links connecting a plurality of processing elements are bi-directional parallel communication links, and because the same communication links can be used for both transmitting and receiving. Furthermore, when transmitting data from any two network control units both linked by the same communication link, there is no overhead in switching the direction of bi-directional communication bus since whether to transmit data or not is decided before the transmission data arrives at the communication port. Thus, high speed data communication between processing elements is possible.

Communication links that interconnect respective processing elements and a network interface contain bi-directional parallel communication buses, and when transmitting data between any two processing elements, the same bi-directional parallel communication bus can be used for transmitting data from one processing element to the other or for receiving data from the other processing element.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an illustrative view showing structure of the external data memory shown in FIG. 2;

FIGS. 4 and 5 are illustrative views showing different packet formats used in the FIG. 1 embodiment;

FIG. 6 is an illustrative view showing a number register comprised in an input control unit shown in FIG. 2;

DETAILED DESCRIPTION OF THE PREFERRED EMBODIMENTS

Figure 1:
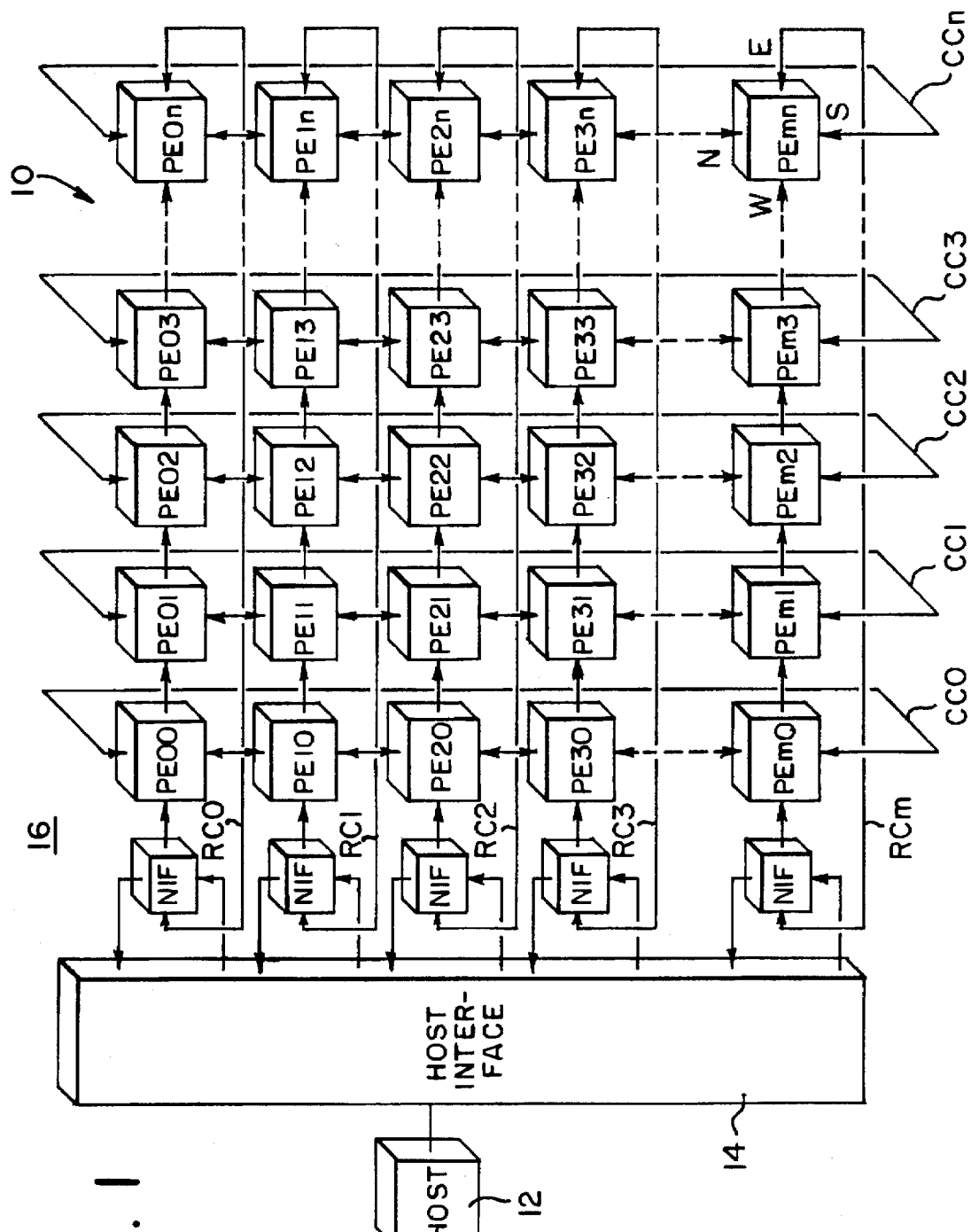
FIG. 1 is a block diagram showing an embodiment of a data-flow parallel computer according to the present invention.

FIG. 1 shows a block diagram of a data-flow parallel computer as a preferred embodiment according to the present invention. In the following, the present invention is applied to a data-flow parallel computer system, but it should be noted that, unless otherwise specified, the present invention can be similarly applied to parallel computer systems not having the data-flow configuration.

Referring to FIG. 1, a parallel computer system 10 of this embodiment shown includes a host computer (this may be a network of a higher hierarchy) 12, and the host computer 12 is connected to a network 16 via a host interface 14.

Figure 2:
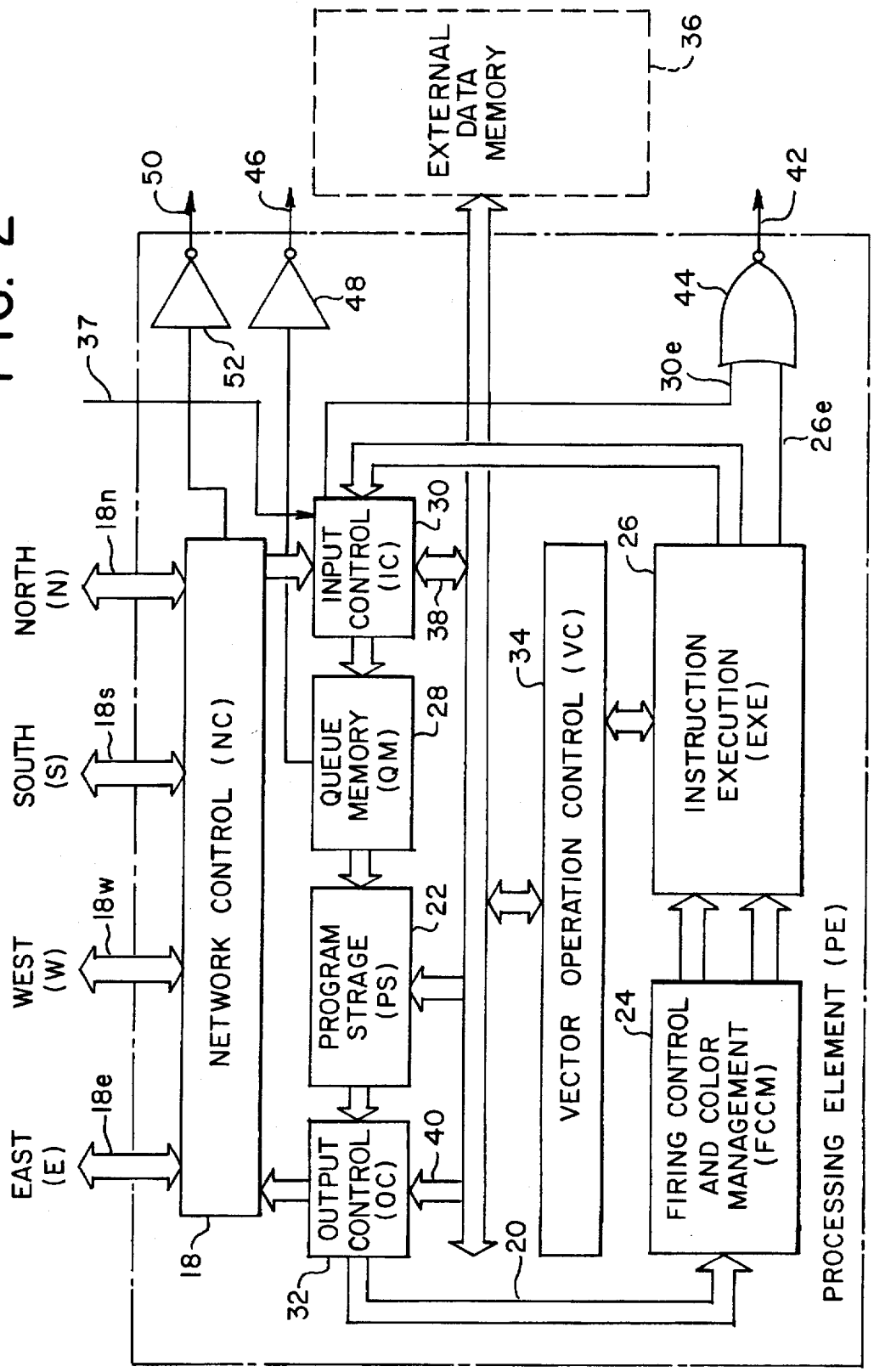
FIG. 2 is a block diagram showing one example of a processing element(PE) shown in FIG. 1 embodiment.

The network 16 includes a plurality of processing elements PE00 through PEmn, which are arranged in a mesh matrix. Each of the processing elements PE00 through PEmn is constructed as shown in FIG. 2. In the network 16, the processing elements PE00 through PEmn form a torus mesh network. The torus mesh network means structure in which a plurality of processing elements are arranged in matrix and data transmission between arbitrary processing elements is possible by the use of row directional communication line RC which cyclically connect row directional processing elements, and column directional communication line CC which cyclically connect column directional processing elements. In this embodiment shown FIG. 1, in a first row, n processing elements PE00 through PE0n are cyclically linked (in a circle) by a row directional communication line RC0, a second row, processing elements PE10 through PE1n are cyclically linked by a row directional communication line RC1, and in an m-th row, processing elements PEm0 through PEmn are cyclically linked by a row directional communication line RCm. In addition, in a first column, m processing elements PE00 through PEm0 are cyclically linked by a column directional communication line CC0, in a second column, processing elements PE01 through PEm1 are cyclically linked by a column directional communication line CC1, and in an n-th column, processing elements PE0n through PEmn are cyclically linked by a column directional communication line CCn.

In the taurus mesh network 16, for each of column directional communication lines CC0, CC1, . . . , CCn, a network interface NIF is inserted as an inserter so that the data transmission is possible between the host computer 12 and each of the processing elements PE00 through PEmn.

A processing element PE shown in FIG. 2 is a one-chip LSI comprising a network control unit(NC) 18 and a pipeline ring(PR) 20. The processing element PE further includes a program storage unit(PS) 22, a firing control and management unit(FCCM) 24, an execution unit(EXE) 26, and a queue memory(QM) 28. Data transfer is performed between the pipeline ring 20 and the network control unit 18 via an input control unit(IC) 30 and an output control unit(OC) 32.

The network control unit 18 has four bi-directional communication links and ports designated at north(N), east(E), south(S), and west(W), and the same controls the transfer of data between the pipeline ring 20 and the network control unit 18 and between the host computer 12 and other processing elements. In other words, the network control unit 18 takes a packet as input from any one of the four ports 18e, 18w, 18s and 18n and either sends it as an input to the input control unit 30 or sends a packet as an output to other ports. Likewise, the network control unit 18 takes a packet which is output from the pipeline ring 20 and outputs a packet to either one of the four ports 18e, 18w, 18s and 18n. In addition, as discussed further below in connection with FIG. 6, the network control unit 18 has a self routing capability that outputs an input packet to a specific port so that a packet which is input from a certain port may arrive at the destination processing element over a minimum distance.

The input control unit 30 includes a buffer register which has a size equivalent to one packet so as to temporarily store the packet which is input from the network control unit 18, and the packet received by the input control unit 30 is then input to the pipeline ring 20. Although not shown in detail, the input control unit 30 further includes various registers. These registers are mainly used to store the processing element number of the processing element comprising the registers, the destination processing element number to which a dumped packet is to be sent, and the status flag of the processing element. As necessary, the input control unit 30 sends packets to a vector operation unit(VC) 34.

The queue memory 28 functions as a buffering memory to absorb variations in the flow of data in the pipeline ring 20, and is, for example, constructed as an FIFO (first in first out) memory. The queue memory 28 is used when any of the following takes place—(1) copying, (2) forced input to the pipeline ring 20, (3) delay in output from the pipeline ring 20, or (4) search through a waiting list of the firing control and color management unit 24. The processing element PE of this embodiment shown has a function for dynamically changing a mode of the above operations (1) through (3) in accordance with an amount of data held by the queue memory 28, and the same in turn controls a parallelism of the system. If, by any chance, the queue memory 28 overflows, an extended queue area (FIG. 3) is formed in the external data memory 36 to absorb the overflow, and the execution of program is continued.

The program storage 22 includes a program memory whose primary purpose is storing data-flow programs which are made up of such information as connection information of a data-flow graph and instruction codes of each node, and performs such operations as updating control information e.g., the node number, data copying, and application of constants.

The output control unit 32 has a buffer memory which can temporarily store packets which are either in the pipeline ring 20 or from the vector operation control unit 34. As previously described, packets which are output from the output control unit 32 are output to one of the four ports 18e, 18w, 18s and 18n.

The firing control and color management unit 24 waits for arrival of left and right operands to execute instructions, waits for arrival of a number of data for synchronized operations, acquires a color for calling subroutine, and gives back the color for returning from subroutines. A packet output from the firing control and color management unit 24 is transferred to the instruction execution unit 26 which executes various operations such as a 32-bit floating point arithmetic operation, a 32-bit integer arithmetic operation, a memory access, a vector operation, an input/output of a structure, decision of a condition, and branching.

The external data memory 36 may, for example, consist an SRAM of 512 Kbytes and is divided into a plurality of areas for various purposes. In other words, as shown in FIG. 3, the external data memory 36 has a program storage area 36a for storing programs which are transmitted from the host computer 12, that is, from an exterior, a data storage area 36b for storing data to be used in arithmetic operations, an expanded queue area 36c which is used when an extended queue is to be formed, and a save area 36d for saving data. It should be noted that, as will be discussed later, data is saved in response to the save request signal 37 which is given to the input control unit 30 from an exterior source, the host computer 12, for example.

The vector operation control unit 34 controls vector operations such as operations among vectors stored in the external data memory 36, vector and constant operations, vector data summation, and vector copying. The vector operation control unit 34 can also control ordinary memory access instructions. An input/output bus 38 which is used for vector data input connects the vector operation control unit 34 and the input control unit 30, and an output bus 40 which is used for the vector data output connects the vector operation control unit 34 and the output control unit 32.

In the embodiment shown, three signals, 42, 46 and 50 can be output to an outside, e.g., to the host computer 12 (FIG. 1) from the processing element PE. An error request signal 42 is obtained by a NOR 44 between an operation error signal 26e which is activated when an error such as overflowing or execution of illegal instruction is generated in the instruction execution unit 26, and a queue overflow signal 30e which indicates that it is no longer possible to continue the data processing due to the overflow in both the queue memory 28 and the external data memory 36. A queue busy signal 46, which indicates that at least one packet exists in the queue memory 28, is output from the queue memory 28 through the inverter 48, and a network busy signal 50, which indicates that at least one packet exist in the network control unit 18, is output through the inverter 50.

It is to be noted that, in the embodiment, each of the NOR gate 44 and the inverters 48 and 52 is constructed an open drain output circuit so as to enable to process the signals in a wired-OR manner. However, in any case, this should not act as a limitation in their construction. The error request signal 42, the queue memory busy signal 46 and the network busy signal 50, and features associated therewith will be described later.

FIGS. 4 and 5 show structure of packets used in the data transmission between the processing elements in the embodiment shown in FIG. 1. A communication packet may be broadly classified into a scalar packet which is shown in FIG. 4 and a structure packet which is shown in FIG. 5. In FIGS. 4 and 5, "PE-X" and "PE-Y" respectively indicate east-west directional number (row number) and south-north directional number (column number) of a destination processing element. "CTL" is a control information and contains such information as a color and load dump destination code. "OT" is a flag to indicate that the packet carrying the flag is to be transmitted to the outside of the network 16 (FIG. 1). "NODE NUMBER" is a node number for discerning instructions in data-flow graphs. "DATA" indicates data, and in the scalar packet shown in FIG. 4, "DATA" has a single 32-bit word which is divided into upper 16 bits and lower 16 bits. In the structure packet shown in FIG. 5, "DATA" has a plurality of 32-bit words each of which is divided into upper 16 bits and lower 16 bits. By looking at the most significant two bits of each word, it is possible to identify the word as being a header, tail or other words of a packet. Furthermore, the most significant bit of every other word is inverted and can act as a transfer control bit to indicate the existence of data.

As previously mentioned, the input control unit 30 has a processing element number register, as shown in FIG. 6, for storing the processing element number which is an inherent number of the processing element comprising the input control unit 30. In FIG. 5, "PE-X" is the east-west directional number, or the column number, of the torus mesh network 16 (see FIG. 1), and "PE-Y" is the south-north directional number, or the row number. "PE-X" and "PE-Y" constitute a processing element number which inherently identifies each processing element. A flag PEACT, shown in FIG. 6, is a flag for indicating whether a processing element number has been already assigned. Its value is "0" if the number has not been assigned, and it is set to "1" when the number is assigned. The flag PEACT is reset by the system initialization signal (hardware reset).

The network control unit 18 changes its operation mode according to a state of the flag PEACT shown in FIG. 6. When the flag PEACT is "0", or when a processing element number has not been assigned, the network control unit 18 is set to a special mode, and when the flag PEACT is "1", it is set to a normal mode. In the special mode, the network control unit 18 considers all the arriving packets from all of the ports as input packets to be received by the current processing element. The network control unit 18 then transfers these packets to the pipeline ring 20 and performs predetermined operations which are designated by identification codes contained in the packets. In the normal mode, the network control unit 18 first compares the processing element number in the first word of an arriving packet and the processing element number in the number register (FIG. 5) of the current processing element, and then transfers the arriving packet to the pipeline ring 20 only when both numbers match. When the numbers do not match, the packet is output to one of the ports according to a predetermined routing algorithm.

In other words, when the flag PEACT is "0", the network control unit 18 determines whether to send out the arriving packet as output to one of the ports 18e, 18w, 18s, and 18n or to transfer the arriving packet to the pipeline ring 20 according to a predetermined algorithm.

When the flag OT shown in FIGS. 4 and 5 of the arriving packet is "1", the network control unit 18 performs control operations to transmit the packet to the outside of the network 16 via the network interface NIF (FIG. 1).

Although not shown, in this embodiment shown, a mode signal TAN is sent to the processing element PE from the outside, e.g., from the host computer 12 (FIG. 1). The mode signal TAN instructs whether to set the data communication between the processing elements to a bi-directional communication mode or to a unidirectional communication mode. One feature of the present embodiment is that the network control unit 18 is switched between the bi-directional communication mode and the unidirectional communication mode in accordance with the mode control signal TAN.

Figure 7:
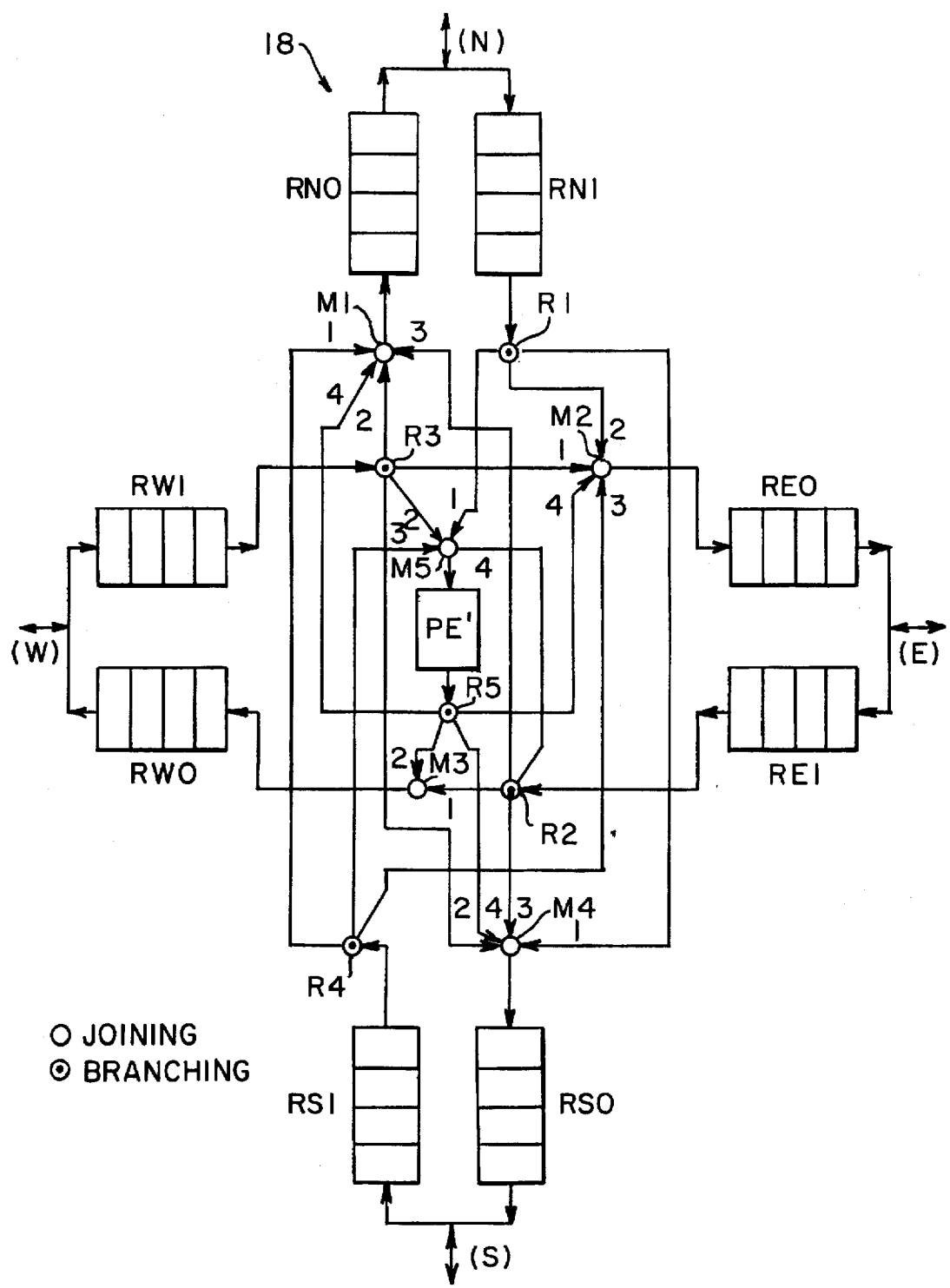
FIG. 7 is a block diagram showing a network control unit shown in FIG. 2.

Referring to FIG. 7, the network control unit 18 included in each processing element will be described in further detail. Input shift registers RNI, REI, RSI and RWI, and output shift registers RNO, REO, RSO and RWO are connected in parallel to the ports N(18n), E(18e), S(18s) and W(18w). Each of the shift registers may, for example, consist of a self synchronizing shift register of 18 bits×4 stages. Outputs from the input shift registers RNI, REI, RWI and RSI are given to branching circuits R1, R2, R3 and R4 respectively, and inputs to the output shift registers RNO, REO, RWO and RSO are taken from joining circuits M1, M2, M3 and M4.

The branching circuit R1 outputs input packets from the input shift register RNI to the joining circuits M2, M4 and M5. Similarly, input packets from the input shift register REI are output to the branching circuits M1, M3, M4 and M5. Packets coming in from the input shift register RSI are input to the joining circuits M1, M2 and M5 via the branching circuit R4. Likewise, packets coming in from the input shift register RWI are input to to the joining circuits M1, M2, M4 and M5.

The joining circuit M1 first joins packets sent from the branching circuits R2–R5 and then sends joined packets to the output shift register RNO, or the port N(18n). The joining circuit M2 joins packets sent from the branching circuits R1, R3, R4 and R5 and sends joined packets to the output shift register REO, or the port E(18e). The joining circuit M3 joins packets from the branching circuits R2 and R5 and sends joined packets to the output shift register RWO, or the port W(18w). The joining circuit M4 joins packets from the branching circuits R1, R3, R2 and R5 and sends joined packets to the output shift register RSO, or the port S(18s).

The branching circuit R5 receives packets from the output control unit 32 which is included in the pipeline ring 20 (FIG. 2) and sends the packets to one of the joining circuits M1 through M4. The joining circuit M5 joins packets from the branching circuits R1 through R4 and then sends joined packets to the input control unit 30 which is included in the pipeline ring 20 (FIG. 2).

On the following assumption the, routing algorithm of the branching circuits R1–R5 is as follows:

The network is a torus mesh as shown in FIG. 1 and has a network size of m×n. The current processing element number is denoted as x, y, and the destination processing element number is denoted as X, Y. At each processing element's network control unit 18, $\Delta x$ and $\Delta y$ which are differences between the current processing element number and the destination processing number are calculated according to the following equation.

$$\Delta x \equiv (X - x) \bmod n$$

$$\Delta y \equiv (Y - y) \bmod m$$

where $|\Delta x| \leq n/2$, and $|\Delta y| \leq m/2$

Furthermore, the processing elements are numbered in north(N) to south(S) order as y=0, 1, 2, ..., m and in west(W) to east(E) order as x=0, 1, 2, ..., n. Any packets having "1" for its flag OT (FIGS. 4 and 5) are packets that need to be transmitted to the outside, e.g., to the host computer 12. The flag PEACT (FIG. 6) indicates whether a processing element number has been already assigned.

(1) The branching circuit R1 sends packet to the joining circuit M5 when PEACT=1, $\Delta y=0$, and OT=0.

sends packet to the joining circuit M2 when PEACT=1, $\Delta y=0$, and OT=1.

sends packet to the joining circuit M4 for cases not stated above.

(2) The branching circuit R2 sends packet to the joining circuit M4 when PEACT=1, $\Delta x=0$, and $\Delta y>0$.

sends packet to the joining circuit M4 when PEACT=1, $\Delta x=0$, $\Delta y<0$, and TAN=1.

sends packet to the joining circuit M1 when PEACT= 1, $\Delta x=0$, $\Delta y<0$, and TAN=0.

sends packet to the joining circuit M5 when PEACT=1, $\Delta x=0$, $\Delta y=0$, and TAN=0.

sends packet to the joining circuit M3 for cases not stated above.

(3) The branching circuit R3 sends packet to the joining circuit M4 when PEACT=1, $\Delta x=0$, and $\Delta y>0$.

sends packet to the joining circuit M4 when PEACT=1, $\Delta x=0$, $\Delta y<0$, and TAN=1.

sends packet to the joining circuit M1 when PEACT=1, $\Delta x=0$, $\Delta y<0$, and TAN=0.

sends packet to the joining circuit M5 when PEACT=1, $\Delta x=0$, $\Delta y=0$, and TAN=0.

sends packet to the joining circuit M2 for cases not stated above.

(4) The branching circuit R4 sends packet to the joining circuit M5 when PEACT=1, $\Delta y=0$, and OT=0.

sends packet to the joining circuit M2 when PEACT=1, $\Delta y=0$, and OT=1.

sends packet to the joining circuit M1 for cases not stated above.

(5) The branching circuit R5 sends packet to the joining circuit M4 when PEACT= 1, $\Delta x=0$, and $\Delta y>0$.

sends packet to the joining circuit M4 when PEACT=1, $\Delta x=0$, $\Delta y<0$, and TAN=1.

sends packet to the joining circuit M1 when PEACT=1, $\Delta x=0$, $\Delta y<0$, and TAN=0.

sends packet to the joining circuit M3 when PEACT=1, $\Delta x<0$, and TAN=0.

sends packet to the joining circuit M2 for cases not stated above.

(6) As has been stated, when PEACT=0, all of the branching circuits send packets to the joining circuit M5, regardless of which of the ports 18e, 18w, 18s, and 18n the packets come from. These packets are taken in by the processing element PE.

The packets sent to the joining circuits M1, M2, M3 and M4 are sent, respectively, to the output shift register RNO of the north port N, the output shift register REO of the east port E, the output shift register RWO of the east port W, and the output shift register RSO of the east port S. Packets sent to the joining circuit M5 are sent to the pipeline ring 20 via the input control unit 30 (FIG. 2).

In the network control unit 18 of FIG. 7, routing is done according to the above described algorithm when it receives the header of a packet. Subsequent data is output by the same route until the tail of the packet arrives.

In the embodiment of FIG. 7, modulo calculations were performed in a manner indicated by the above equations with the based on the assumption that each of the processing element PE is being used in a torus mesh network 16 of FIG. 1. However, such modulo calculations should not be necessary when the communication lines RC and CC are not cyclic. It should be noted that the algorithm described above for the branching circuits R1 through R5 is merely an example, and it may be freely altered at will.

Thus, when PEACT=1, a packet being transmitted between the processing elements is first transferred along the communication line in east-west (E⇆W) direction until the column number matches. The packet is then moved to the communication line in south-north (S⇆N) direction and is transferred along south-north communication line until the row number matches at the designation processing element.

In a data communication between the processing elements, when the signal TAN=1, data transmission in all directions, east-to-west, west-to-east, south-to-north, and north-to-south, are possible. However, when the signal TAN=0, data transmissions in east-to-west and south-to-north directions are forbidden, and the data communication among the processing elements is done only by unidirectional data transmissions in west-to-east and north-to-south directions.

Accordingly, in this embodiment shown of a parallel computer system, deadlocks arising from bi-directional data communication can also be avoided. That is, when all the packets being transmitted on the network 16 have a fixed number of words, all the processing elements are set to the bi-directional communication mode (TAN=0), e.g., by the host computer 12, and when some of the packets have a variable number of words, all the processing element are set to the unidirectional communication mode (TAN=1) by the host computer 12. As previously described, in the unidirectional communication mode, since data is communicated between the processing elements only by communications in west-to-east and north-to-south directions, the situation in which two packets are transmitted to the opposite directions on the same communication line is avoided.

Other notable feature of the present embodiment is the communication control method of the network control unit 18 of each processing element at a timing when a packet whose flag OT is "1" arrives. More specifically, when OT=1 all the bits of the destination processing elements number (PE-X) of the packet are considered to be "1". Accordingly, in the present embodiment, when the packet's flag OT is "1", the above described Δx is computed under the consideration that all the bits of the row number "X" of the packet's destination processing element number are "1". In other words, the packet having OT=1 which is to be transmitted to the outside of the network 16 is routed under the assumption that its destination is the eastwardmost processing element in the column, regardless of its destination processing element's column number. After this outwardbound packet is transmitted to the most eastward column, the same is sent to the east port 18e and is then output to the outside, e.g., to the host computer 12 via the network interface NIF.

According to the present embodiment, the field containing the destination processing element column number of a packet which is to be transmitted to the outside can be used as a field for storing "other information", because all the bits of the field are considered to be "1" when OT=1.

Figure 8:
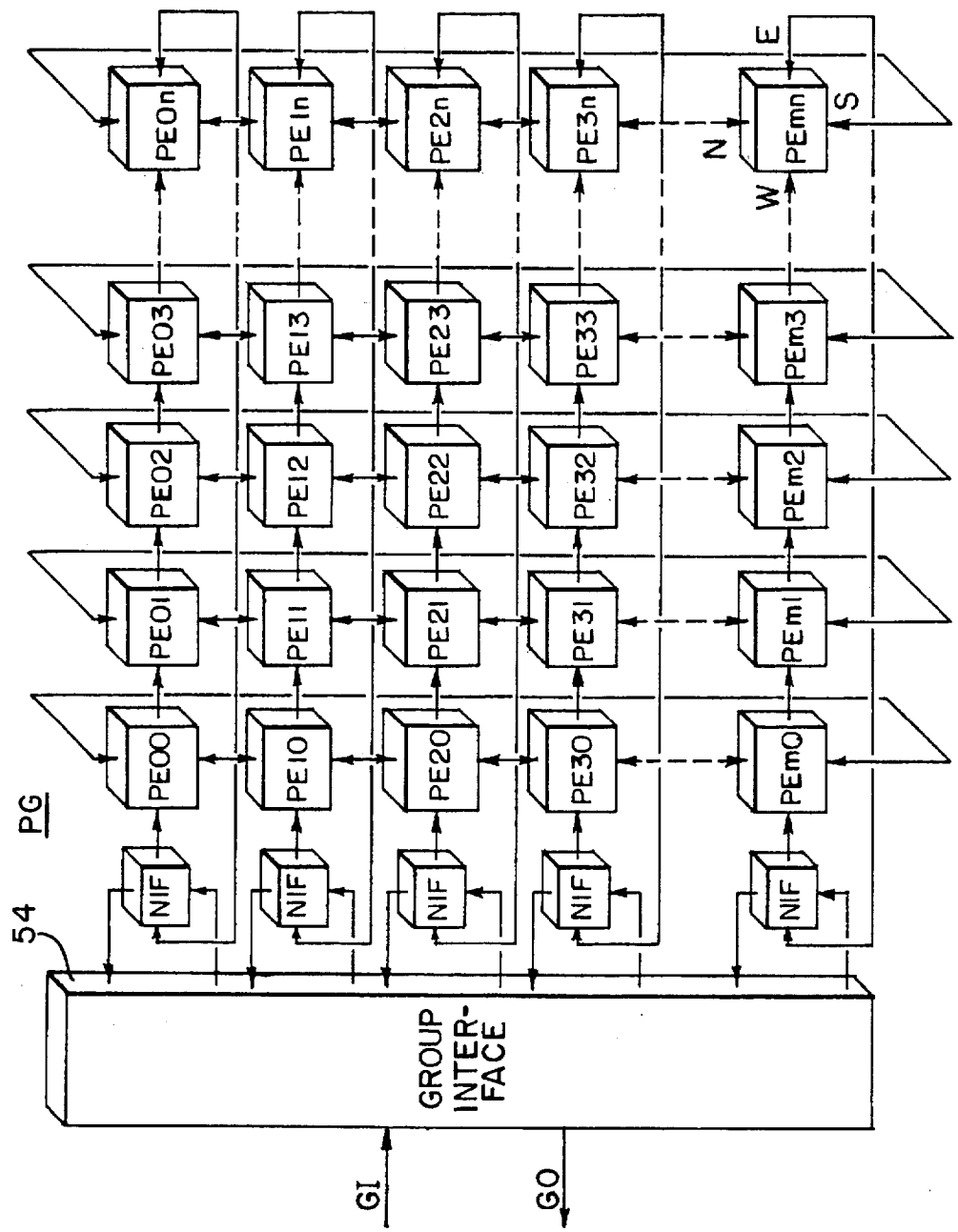
FIG. 8 is a block diagram showing another embodiment according to the present invention.
Figure 9:
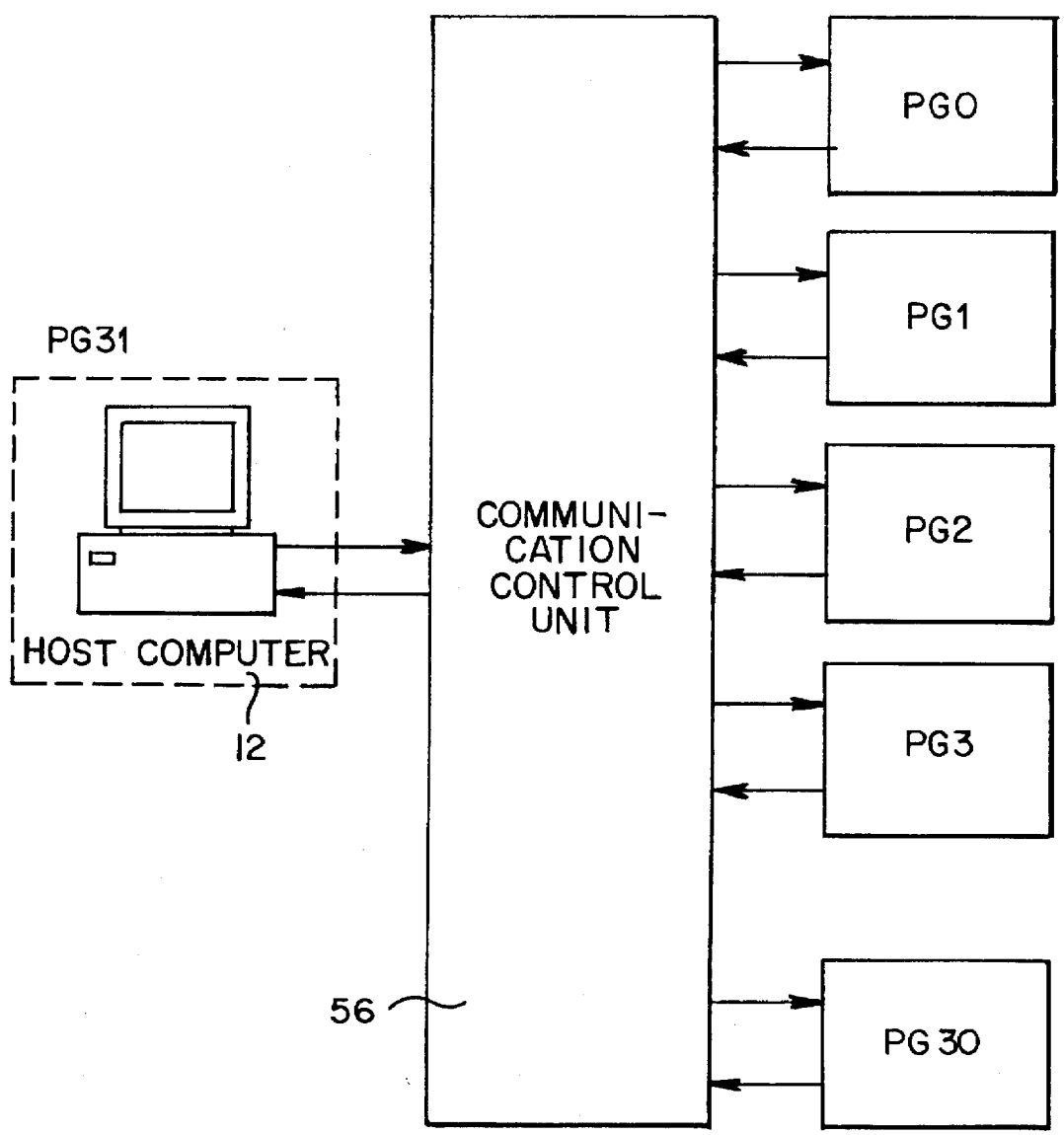
FIG. 9 is a block diagram showing a system employing the FIG. 8 embodiment.

In the embodiment shown in FIGS. 8 and 9, the above column number field is used as a field for the destination processing elements group number.

More specifically, if all the processing element numbers of the processing elements closest to the network interface NIF need to be completely specified in specifying the destination processing element number, the number of processing elements in a parallel computer system 10 become restricted. That is, as previously described, since the destination processing element number also includes the column number (PE-X) and the row number (PE-Y), when the destination processing element number field is a 10-bit field, only a parallel computer system having 1024(=$2^{10}$) elements can be constructed. Although it is possible to increase the number of the processing elements by increasing the number of bits used for the destination processing element number, the increase in the number of bits leads to an increase in the word length of the data being communicated which, in the end, leads to the increase in a hardware size of the parallel computer system as a whole.

The embodiment shown in FIGS. 8 and 9 avoids such a problem and increases the number of processing elements by utilizing the column number field when the flag OT=1.

FIG. 8 shows an example of a processing elements group PG in which a group interface 54 for transferring data with the other processing elements groups is coupled to the above mentioned torus mesh network 16. In FIG. 8, the reference symbol GI denotes a group input line and the reference symbol GO denotes a group output line.

FIG. 9 shows a large parallel computer system in which a plurality of processing elements, each of which is shown in FIG. 8, are connected. In FIG. 9, processing elements groups PG0, PG1, PG2, PG3, . . . , PG30 are coupled to a host computer 12 which is perceived as a processing element group PG31. Each of the processing elements groups PG0, PG1, PG2, PG3, . . . , PG30 is configured as shown in FIG. 8. A communication control unit 56 controls data communications between processing elements groups PGs.

In the embodiment of FIG. 9, as "other information", a destination processing elements group number, which in this case may be any of the numbers "0", "1", "2", "3", - - -, "31", is set into the column number field "PE-X" of the destination processing element number of the packet to be transmitted between the host computer 12 and a processing elements group PG. From each of the processing elements groups, an outwardbound packet is sent out in accordance with the algorithm described previously. The communication control unit 56 transmits the packet to its destination processing elements group in accordance with the packer's destination processing elements group number.

Thus, by using the destination column number field of a packet in each processing element group as the field for the processor group number, it is possible to construct a large parallel computer system having of more than 30000 processing elements even if the destination processing element number field has only 10 bits.

In the following, the save request signal 37 (FIG. 2) and operations related to the signal are described. In a processing element of this embodiment, when the queue memory 28 overflows, the overflow is absorbed by forming the extended queue area 36c in the external data memory 36. More specifically, when the queue memory 28 overflows, the input control unit 30 takes the data which is to be written into the queue memory 28 and writes the data into the extended queue area 36c via the input/output bus 38. When the queue memory 28 becomes available to be written, the input control unit 30 reads data out of the extended queue area 36c and writes the data to the queue memory 28 via the input/output bus 38. The formation of such an extended queue area enables the execution of the program to continue even when the queue memory 28 overflows. However, when the extended queue area 36c also overflows, the input control unit 30 outputs the queue overflow signal 30e as described earlier.

Figure 10:
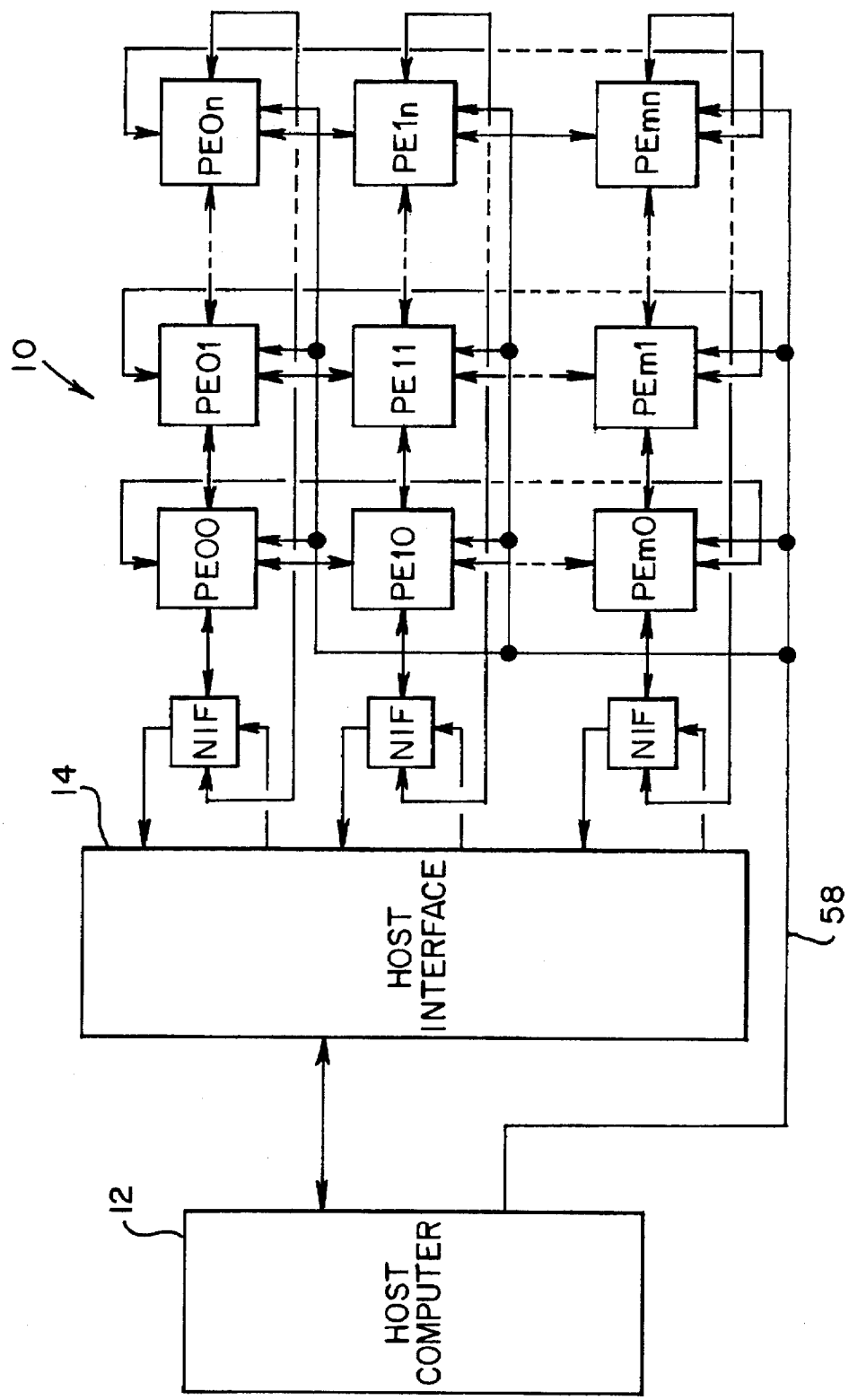
FIG. 10 is a block diagram showing a further embodiment according to the present invention.

In the embodiment of FIG. 10, the data on the pipeline ring 20, which may exist in any of the the program storage 22, the firing control & color management unit 24, the instruction execution unit 26, and the queue memory 28, is automatically written to the external data memory 36 in response to the save request signal 37 using hardware similar to that used in the formation of the extended queue area 36c in the above.

In FIG. 10, the save request signal 37 is given to each of the processing elements PE00 through PEmn via a signal line 58 from the outside, e.g., from the host computer 12. After the save request signal 37 is given via the signal line 58, the input control unit 30 writes, via the input/output bus 38, the data which are successively input through the instruction execution unit 26 to the extended queue area 36c of the external data memory 36. If the extended queue area 36c overflows, the input control unit 30 writes the data to the save area 36d of the external data memory 36.

Furthermore, when the queue overflow signal 30e (FIG. 2), which is transmitted from the input control unit 30 when the extended queue area 36c overflows while the extended queue area 36c is being formed, or the operation error signal 26e (FIG. 2) given from the instruction execution unit 26 is transmitted from the input control unit 30, the input control unit 30 automatically writes the data to the extended queue area 36c or to the save area 36d of the external data memory 36, regardless of the existence of the save request signal from the signal line 58.

Once the saving operation is completed, saved data can be read out from the outside, i.e., from the host computer 12, in a manner similar to reading out a program from the program storage area 36a or to reading out data from the data storage area 36b. Therefore, a user can easily find out the cause of an error by analyzing the data which is read out in such a manner.

According to the embodiment of FIG. 10, when a processing element falls in a deadlock state, the data existing within the processing element is automatically saved in the external data memory 36. Furthermore, no additional hardware is required for such a saving operation, and the saved data can be read out in a simple manner.

Even though errors occur within processing elements constituting a parallel computer system such as the one mentioned above, in general, processing elements that do not send out error information are often used in such a parallel computer system. In past, when processing elements which cannot output their internal error information were used, there was no way of detecting an occurrence of an error other than by having the host computer 12 which controls the entire parallel computer system dump the contents of all the processing elements. However, with this method which requires the contents of all of the processing elements to be dumped, the host computer had to individually check the internal statuses of all the processing elements. In other words, validity of the operation could only be confirmed after the internal statuses of all the processing elements were found to be normal. In such an error detection method, therefore, the system was burdened by error detection operations aside from originally intended operations.

Even when processing elements having output pins for sending the internal error information to the outside were used, as shown at page 42 of the Transputer manual published October 1986, by the INMOS Ltd., Co., of Btistol, U.K., error signals from the processing elements indicating occurrences of internal errors were logical-OR'ed outside of the system. The result of the logical-OR operation was then sent to the host computer as an error signal. In this case, as the number of the processing elements constituting a parallel computer system increased, the number of the error signal lines in the logical-OR operation also increased. Accordingly, the size of the entire circuit increased due to the increase in the size of the external logic circuit for performing logical-OR operations of error signal lines.

Moreover, all of the error statuses could not be detected solely by using the error signal which indicates the occurrence of internal error. Much effort was therefore being required in analyzing such malfunctions since it was impossible to detect errors such as a network related malfunction or a runaway packet within the system.

Figure 11:
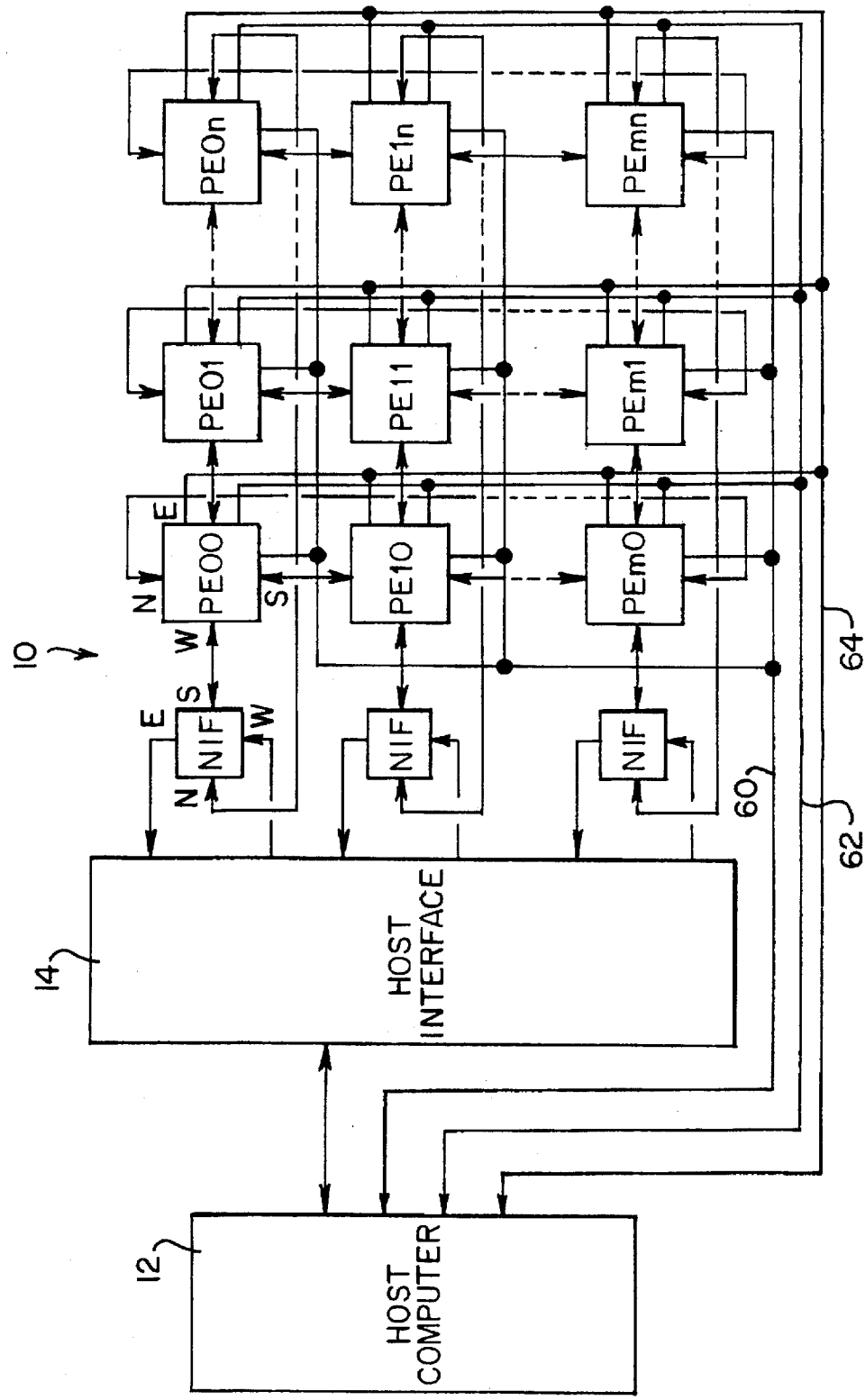
FIG. 11 is a block diagram showing a still further embodiment according to the present invention.

Then, in the embodiment of FIG. 11, as described and shown in FIG. 2, the error request signal 42, the queue memory busy signal 46 and the network busy signal 50 are output through the open drain construction. This makes it possible for any internal errors of the processing elements to be easily detected, e.g., by the host computer 12, without increasing the circuit size. More specifically, in FIG. 11, the signal line 60, which groups the error request signals 42 from each of the processing elements by wired-OR connections, connects each of the processing elements PE00 through PEmn with the host computer 12. Similarly, the signal line 62, which groups the queue memory busy signals 46 from each of the processing elements by wired-OR connections, connects each of the processing elements PE00 through PEmn with the host computer 12.

The host computer 12 then determines the error status, which is listed in the following table, based on the error request signal 42, the queue memory busy signal 46, and the network busy signal 50 of the processing elements via the signal lines 60, 62 and 64.

TABLE

| error request signal 42 | queue memory busy signal 46 | network busy signal 50 | internal status of processing element |
|---|---|---|---|
| 1 | 1 | 1 | not operating |
| 1 | 1 | 0 | malfunction in network control unit |
| 1 | 0 | 1 | runaway packet |
| 1 | 1 | 0 | malfunction in network control unit due to runaway packet |
| 0 | 1 | 1 | arithmetic error |
| 0 | 1 | 0 | malfunction in network control unit due to arithmetic error |
| 0 | 0 | 1 | runaway packet due to arithmetic error |
| 0 | 0 | 0 | network overflow due to arithmetic error and, malfunction in queue memory or network control unit |

Looking at the table, it is easy to see that the host computer 12 is able to estimate the internal statuses of the processing elements based on the combination of error request signal 42, the queue memory busy signal 46, and the network busy signal 50. It should be noted that the error request signal 42, the queue memory busy signal 46, and the network busy signal 50 are active low signals.

More specifically, it can be seen that a processing element is not in operation when all of the error request signal 42, the queue memory busy signal 46 and the network busy signal 50 are inactive ("1"). Here, although the error request signal 42 is inactive when the processing element is operating normally, it can also become inactive when an error occurs.

When the system ceases its operation with only the network busy signal 50 active ("0"), the host computer 12 decides that a malfunction has occurred in the network control unit 18 (FIG. 2) of one of the processing elements. When the system ceases its operation with only the queue memory busy signal 46 active, the host computer 12 decides that a packet is out of control in one of the processing elements. When the system ceases its operation with only the error request signal 42 active, the host computer 12 decides that an arithmetic error has occurred in one of the processing elements.

Furthermore, when the queue memory busy signal 46 and the network busy signal 50 are active, the host computer 12 decides that an abnormality exists in the network control unit 18 of one of the processing elements, the abnormality being such as a packet overflow in the network control unit 18 with a packet out of control in the processing element.

When, in addition to the error request signal 42, the queue memory busy signal 46 is also active, the host computer 12 decides that an abnormality exists in the network control unit 18 of one of the processing elements, the abnormality being such as an arithmetic error or a packet out of control. When, in addition to the error request signal 42, the network busy signal is also active, the host computer 12 decides that in addition to occurrence of arithmetic error, an abnormality occurs in the network control unit 18 of any one of the processing elements, the abnormality being such as a packet overflow in the network control unit 18.

When all three signals, the error request signal 42, the queue memory busy signal 46 and the network busy signal 50, are active, the host computer 12 decides that an arithmetic error has occurred in one of the processing elements and an overflow has occurred in the queue memory 28 or in the extended queue area 36c, or that an abnormality such as overflow of packets has occurred in the network control unit 18 and the packet is out of control.

Thus, by sending three types of status signals, the error request signal 42, the queue memory busy signal 46, and the network busy signal 50, from each of the processing elements via the signal lines 60, 62, and 64, the host computer 12 can easily examine the internal status of a processing element.

Furthermore, in a prior parallel computer system of this kind, when moving to a certain state, e.g., to initial state or to idle state, all the processing elements were simultaneously set to the certain state by providing a signal common to all the processing elements.

On the other hand, in recent years, parallel computer systems that accomplish a group of operations as a whole by allotting different operations to each of the processing elements are increasing. Furthermore, with the increase in the number of the processing elements, the multi-user environment, in which each user uses a different group of processing elements, will become necessary. Thus, in changing the state of a parallel computer system to a certain state, e.g., to its initial state, the system will be required to have flexibility such that it can change the state of any one or a group of processing elements, in addition to the ability to simultaneously set states of all the processing elements. A processing element will then consist of units such as a network control unit and a instruction execution unit, and in debugging the hardware or the software of the parallel computer system, flexible techniques, such as being able to initializing only the network control unit, will be required in addition to simplify functions such as initialization of the entire processing element.

However, such flexibility could not be found in conventional parallel computer systems, and to realize such flexibility in setting the state of any one or a group of processing elements to one particular state would require the same number of control signal lines as the number of the processing elements. Accordingly, in a parallel computer system having several thousand or more processing elements, the number of control lines required would become enormous and its hardware construction would then be unrealistic.

Figure 12:
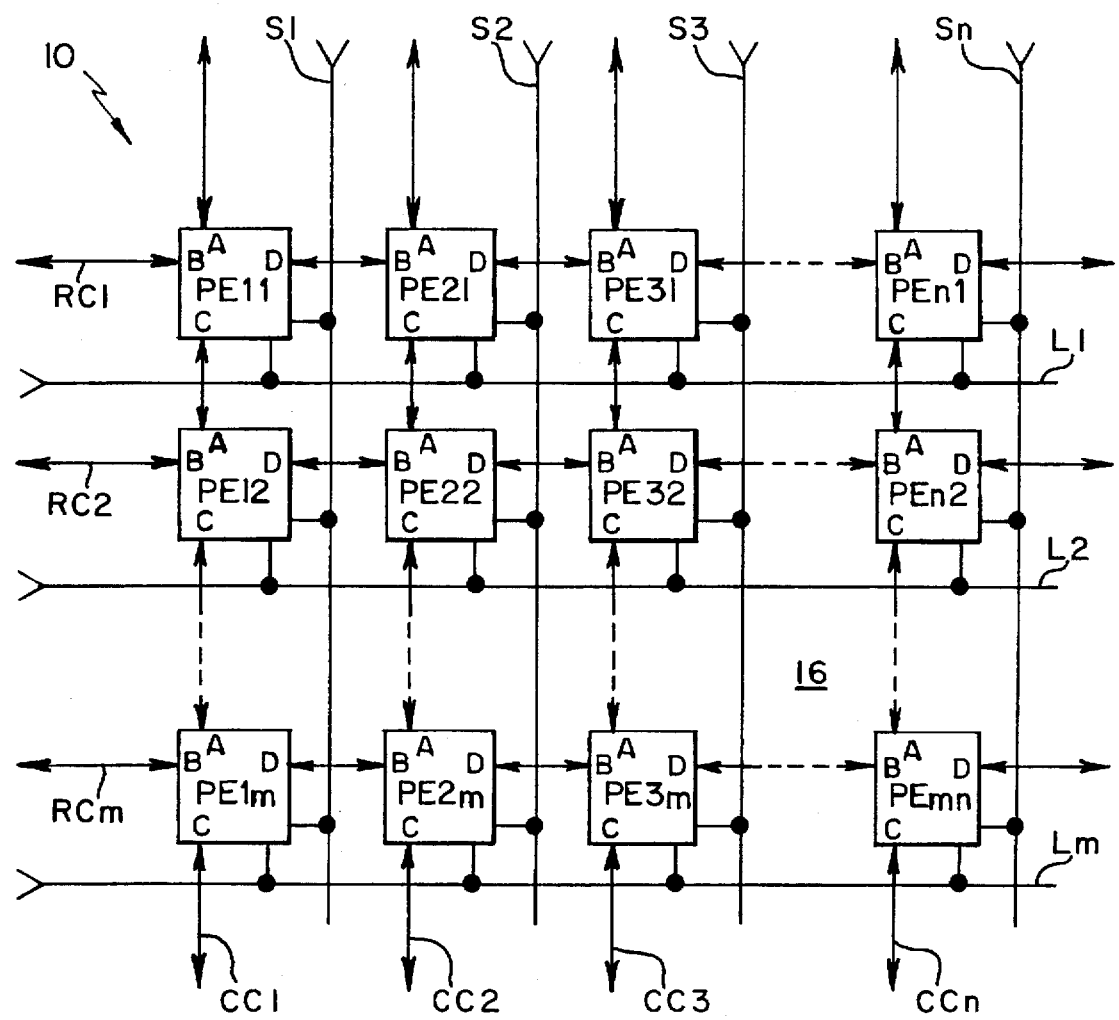
FIG. 12 is a block diagram showing a still further embodiment according to the present invention.
Figure 13:
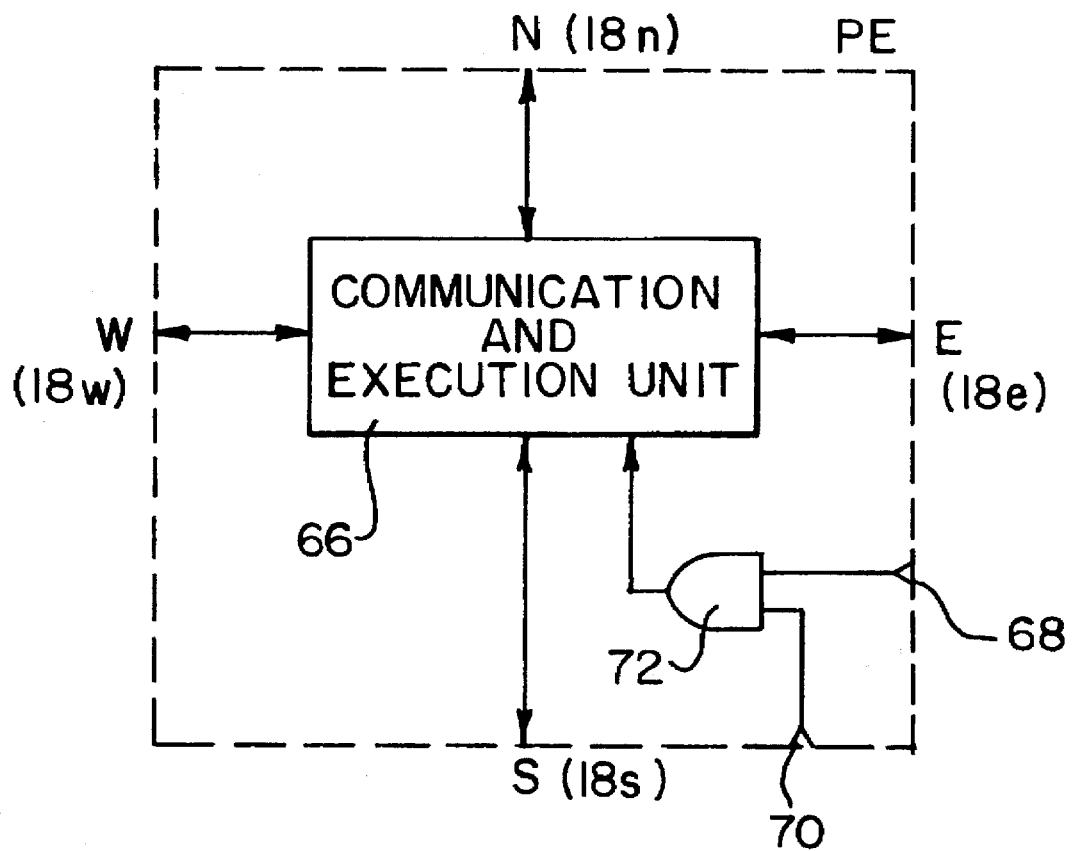
FIG. 13 is a block diagram showing one example of a processing element comprised in the FIG. 12 embodiment.
Figure 14:
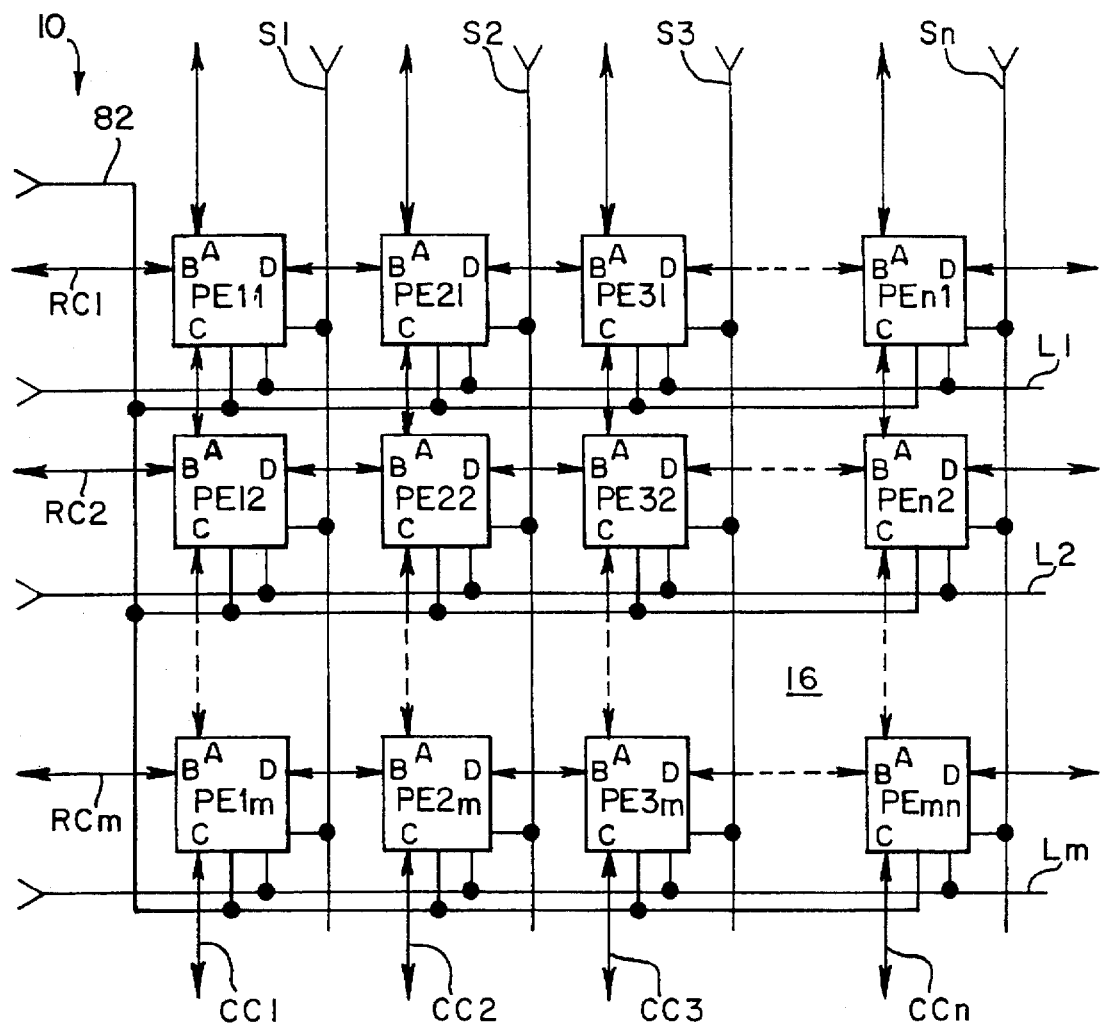
FIG. 14 is a block diagram showing a still further embodiment according to the present invention.
Figure 15:
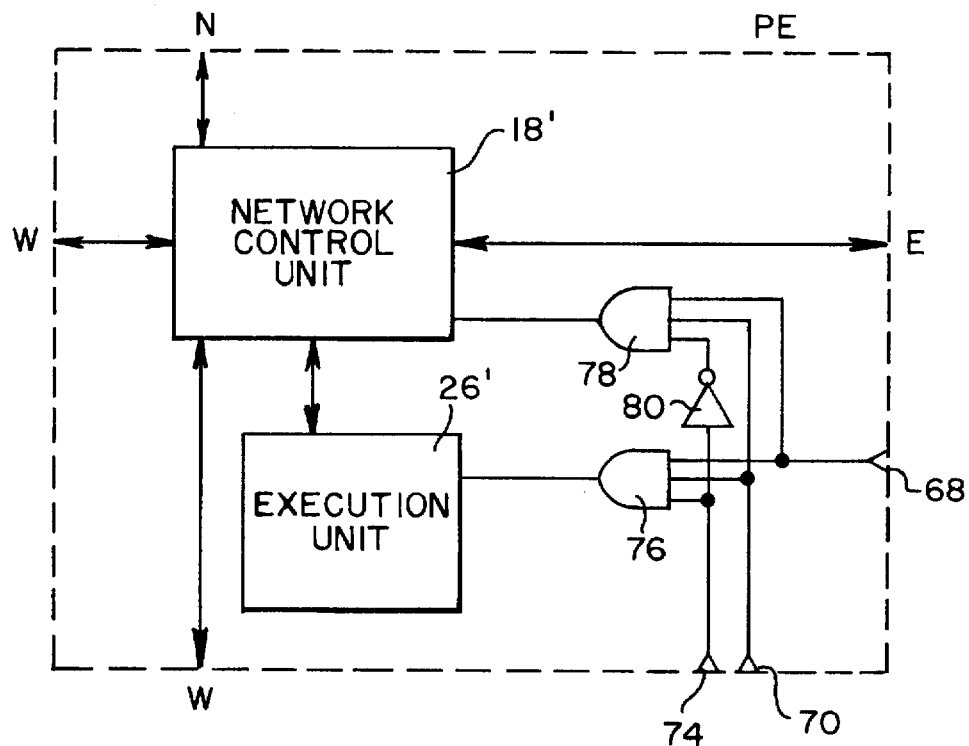
FIG. 15 is a block diagram showing one example of a processing element comprised in the FIG. 13 embodiment.

In the embodiment of FIGS. 12 and 13, it is possible to selectively set any one or a group of processing elements to a specific state with a much fewer number of control lines, and in the embodiment of FIGS. 14 and 15, it is possible to selectively set any particular component included in any one processing element or in any group of processing elements to a specific state.

In the embodiment of FIG. 12, a parallel computer system 10 includes a processing element network 16 as in the previous embodiments. Specifically, each of the processing elements PE11 through PEnm constituting the network 16 is constructed as shown in FIG. 2, but in FIG. 13, the embodiment of FIG. 2 is simplified to the point sufficient enough to understand the present embodiment.

In FIG. 13, the components such as a network control unit 18 which are shown in FIG. 2 are represented as one communication & execution unit 66. Ports N(18n), W(18w), S(18s) and E(18e), which are used for data communication between the processing elements, are connected to the communication & execution unit 66. A processing element PE has a row terminal 68 and a column terminal 70 which are used to set initializing conditions. The processing element PE further includes an AND gate 72 which is used to generate an initialization signal for the communication & execution unit 66 in accordance with the row condition signal from the row terminal 68 and the column condition signal from the column terminal 70. The processing elements PE11 through PEnm are initialized in response to the signal from the AND gate 72 only when both the row condition signal and the column condition signal are active.

In the torus mesh network 16, as has been previously described, the ports 18n and 18s are used to link the processing elements in the column direction, and ports 18w and 18e are used to link the processing elements in the row direction. In the embodiment of FIG. 12, the row condition signal lines L1 through Lm are individually connected to the row terminal 68 of the processing elements which are located in a first row through an m-th row. Similarly, the column condition signal lines S1 through Sm are individually connected to the column terminal 70 of the processing elements which are located in a first column through an n-th column.

In this embodiment shown of a parallel computer system 10, it is possible to initialize any one or any plurality of processing elements out of all the processing elements PE11 through PEnm, by using row condition signals and column condition signals which are, respectively, given from the row condition signal lines L1 through Lm and the column conditional signal lines S1 through Sn. For example, by selecting and then activating a row from the row condition signal lines L1 through Lm and a column from the column condition signal lines S1 through Sn, it is possible to initialize only the processing element which is located at the intersection of both lines intersection. Furthermore, by randomly selecting a plurality of rows from the row condition signal lines L1 through Lm and a plurality of columns from the column condition signal lines S1 through Sn, and simultaneously activating the selected row condition lines and the selected column condition lines, it is possible to initialize only the group of processing elements that fall under the rectangle defined by the activated lines.

Thus, each of the processing elements can be individually initialized by implementing m row condition signal lines L1 through Lm and n column condition signal lines S1 through Sn, or (m+n) lines, the number of which is quite fewer than the number of the processing elements PE11 through PEnm, or (m×n) lines, and also by providing row terminals 66 and column terminals 70 to all of the processing elements PE11 through PEnm, the number of which is also relatively small.

Similarly, another embodiment shown in FIG. 14 also includes a network 16. Specifically, each of the processing elements PE11 through PEnm includes, as shown in FIG. 2, a network control unit 18' for controlling the communication with other processing elements and an execution unit 26' for interpreting and executing the programs. Furthermore, as shown in FIG. 15, the processing element PE includes, in addition to the row terminal 68 and the column terminal 70, a unit selection terminal 74 for selecting the unit to be initialized and AND gates 76 and 78 for generating the initialization signal to be given to the network control unit 18' and the execution unit 26' in accordance with the row condition signal from the row terminal 68, the column condition signal from the column terminal 74 and the signal from the unit selection terminal. An inverter 18 is inserted between the unit selection terminal 74 and the AND gate 78 so that only one of the AND gates 76 and 78 produces the initialization signal. Therefore, in each of the processing elements PE11 through PEnm, the network control unit 18 is initialized only when the signal from the unit selection terminal 74 is inactive and both the row condition signal from the row terminal 68 and the column condition signal from the column terminal 70 are active. On the other hand, the execution unit 26' is initialized only when the signal from the unit selection terminal 74, the row condition signal and the column condition signal are active.

In the embodiment of FIG. 14, in addition to the row lines L1 through Lm and the column condition lines S1 through Sn which are described in the embodiment of FIG. 12, unit selection lines 82 are connected to the unit selection terminals 74 of each of the processing elements PE11 through PEnm.

In the embodiment of FIGS. 14 and 15, the network control unit 18' and the execution unit 26' of any one or plurality of processing elements out of the processing elements PE11 through PEnm can be independently initialized. For example, only the network control units 18' of all the processing elements can be initialized by giving inactive signals to the unit selection terminals 74 and by making all the row condition signal lines L1 through Lm and the column condition signal lines S1 through Sn active. Furthermore, by giving the active signal the unit selection terminals 74 and by first randomly selecting a plurality of rows from the row condition signal lines L1 through Lm and a plurality of columns from the column condition signal lines S1 through Sn, and then simultaneously activating the selected row condition lines and the selected column condition lines, it is possible to initialize only the execution units 26' of a group of processing elements that fall under the rectangle defined by the activated lines.

As stated above, each of the units in each of the processing elements can be individually initialized with only (m+n+ 1) control signal lines, the sum of m row condition signal lines L1 through Lm, n column condition signal lines S1–Sn, and the single unit selection line 82.

It should be noted that in FIGS. 14 and 15, only the network control unit 18' and the execution unit 26', both of which are components subject to individual initialization, are shown. In this case, only the single unit selection line 82 is necessary as there are only two components to be controlled. However, when individually controlling a plurality of components as shown in FIG. 2, for the case of $2^k$ components, k unit selection lines 82, or the total of (m+n+ k) control signal lines, will become necessary. Even in this case, the number of control signals required will still be much fewer than in the conventional cases.

The embodiment of FIGS. 12 through 15 can be shown to be effective for setting a processing element and its units to a specific state, e.g., to idle state.

Figure 16:
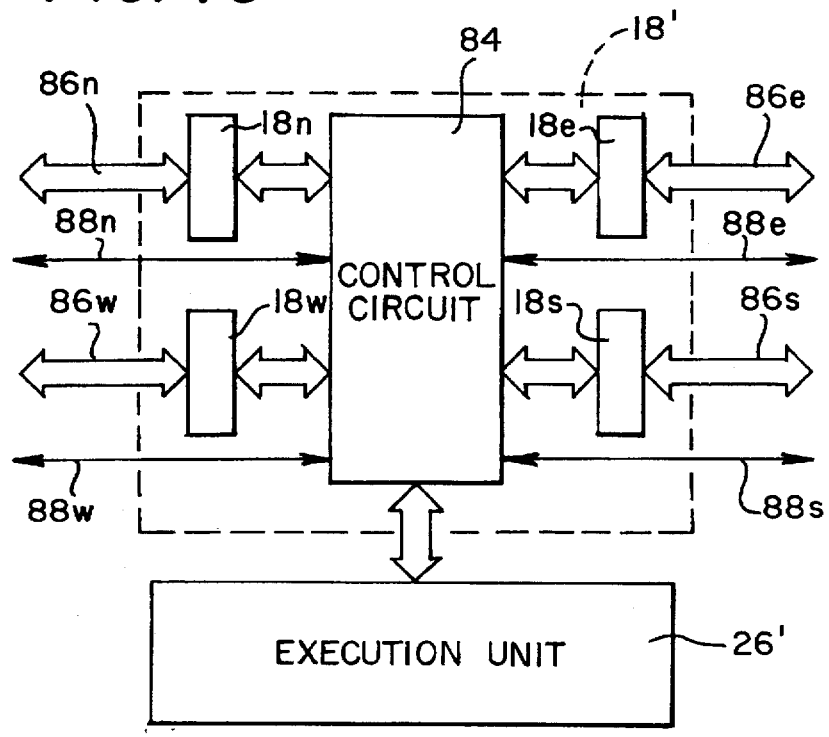
FIG. 16 is a block diagram showing a network control unit.
Figure 17:
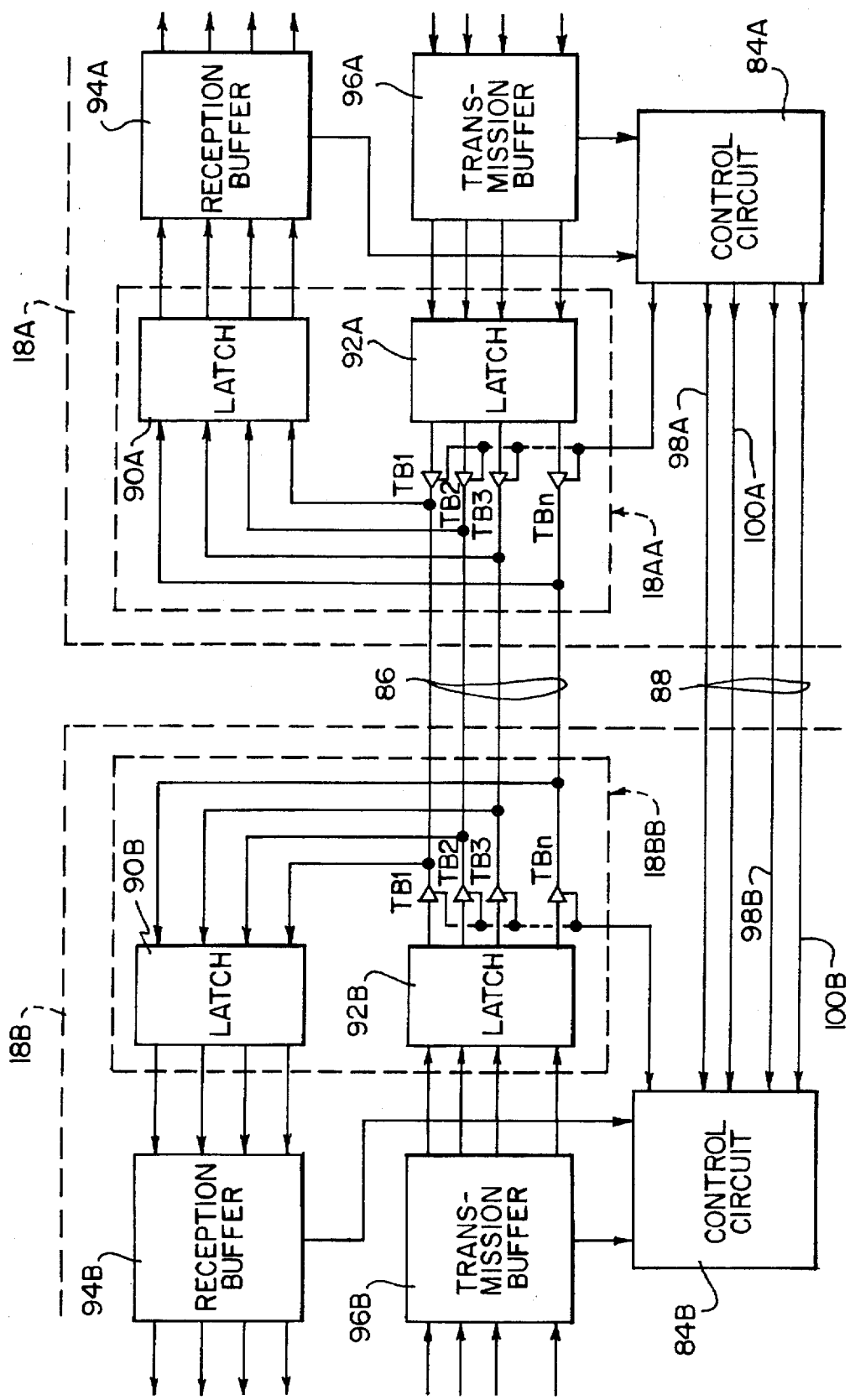
FIG. 17 is a block diagram showing FIG. 16 in more detail.

The embodiment of FIGS. 16 and 17 can be used both in the bi-directional communication mode and in the unidirectional communication mode as has been previously mentioned. Referring to FIG. 16, each of the processing elements constituting a parallel computer system includes a network control unit 18' which controls the data communication between processing elements and a execution unit 26' which executes operations. As previously described, the network control unit 18' includes four bi-directional parallel communication ports 18n, 18e, 18s, and 18w, and these ports are controlled by the communication control unit 84. Furthermore, bi-directional parallel communication buses 86n, 86e, 86s, and 86w are connected to each of the ports 18n, 18e, 18s, and 18w, for communicating with neighboring processing elements. Each network control unit 18' has four communication links each link having the bi-directional parallel communication bus 86 and the communication control signal line 88. Thus, using these communication links, a parallel computer system is constructed by interconnecting a plurality of processing elements as shown in FIG. 1.

The bi-directional parallel communication buses 86n, 86e, 86s and 86w are comprised of data lines of a plurality of bits to perform bit parallel communication with each of the neighboring processing elements. In the communication between two processing elements, the same bi-directional parallel communication bus can be used both for the case where one of the processing element is sending data to the other and for the case where that processing element is receiving data from the other. The communication control signal lines 88n, 88e, 88s and 88w are used to send and receive each others communication status in the data communication with neighboring processing elements.

For example, in the case of the data communication with a neighboring data processing element via the bi-directional parallel communication port 18n, the communication control circuit 84 can efficiently switch the transmission direction of the bi-directional parallel communication bus 86n in accordance with the signal from the communication control line 88n. Its operation is further described below in connection with FIG. 17.

FIG. 17 shows as more detailed view of the area where the network control units 18A and 18B of neighboring processing elements are connected, that is, FIG. 17 shows a connection section of two arbitrary chosen bi-directional parallel communication ports. Referring to FIG. 17, two network control units 18A and 18B are connected by the bi-directional parallel communication bus 86 and the communication control signal line 88. Each of the communication ports 18AA and 18BB of the network control units 18A and 18B comprises reception data latches 90A and 90B which are connected to the bidirection communication bus 86, and transmission data latches 92A and 92B which are connected to the bidirectional communication bus 86 via tri-state gates TA1 through TAn and TB1 through TBn. The received data held by the reception data latches 90A and 90B is loaded into data buffers 94A and 94B, and the transmission data stored in the transmission data buffers 96A and 96B is held by transmission data latches 92A and 92B.

The communication control circuit 84A controls the tri-state gates TA1 through TAn in accordance with the data in the reception data buffer 94A and the transmission data buffer 96A. Similarly, the communication control circuit 84B controls the tri-state gates TB1 through TBn in accordance with the data in the reception data buffer 94B and the transmission data buffer 96B.

Two pairs of signal lines, 98A with 98B and 100A with 100B, are used to link the communication control circuits 84A and 84B. The signal lines 98A and 98B are transmission request signal lines, and the signal lines 100A and 100B are acknowledge signal lines.

In such a construction, when data is not transmitted, outputs from the communication ports 18AA and 18BB, and the tri-state gates TA1 through TAn and TB1 through TBn are disabled, and the transmission request signals 98A and 98B, and the reception acknowledge signals 100A and 100B all have "0".

When transmitting data from the network control unit 18A to the network control unit 18B, the outgoing data is first stored in the transmission data buffer 96A, and then, before the outgoing data is latched by the transmission data latch 92A, the transmission request signal 98A is set to "1" by the communication control circuit 84A. Similarly, when transmitting data from the network control unit 18B to the network control unit 18A, the outgoing data is first stored in the transmission data buffer 96B, and before the outgoing data is latched by the transmission data latch 92B, the transmission request signal 98B is set to "1" by the communication control circuit 84B.

If the transmission request signal 98B from the network control unit 18B is "0" when the data being transmitted from the network control unit 18A to the network control unit 18B become stored in the transmission data buffer 96A at the same time as the data in transmission become latched in the transmission data latch 92A, the tri-state gates TA1 through TAn are enabled by the communication control circuit 84A, causing the data in transmission to be outputted to the bidirectional parallel communication bus 86.

Later, as the data in transmission become latched in the reception data buffer 90b of the network control unit 18B, the reception acknowledge signal 100B is set to "1" by the communication control circuit 84B. In turn, the communication control circuit 84A resets the transmission request signal 98A and once again disables the tri-state gates TA1 through TAn. As the transmission request signal 98A is reset, the reception acknowledge signal 100B is also reset.

If the transmission request signal 98B from the network control unit 18B is "1" when the data in transmission from the network control unit 18A to the network control unit 18B become stored in the transmission data buffer 96A, the communication control circuit 84A first determines that the data being transmitted from the network control unit 18B will be using the bidirectional parallel communication bus 86 at a succeeding timing. The communication control circuit 84A then waits for the received data to be latched by the reception data latch 90A keeping the transmission request signal 98A set to "1". As the received data is latched by the reception data latch 90A, the communication control circuit 84A enables the tri-state gates TA1 through TAn. Then, data transmission operations similar to the ones mentioned above are performed.

Since the operations are similar for the case where the bidirectional parallel communication bus 86 is set to the opposite direction and for the case where data is being sent from the network control unit 18B to the network control unit 18A, further explanation will not be provided.

Thus, efficient bi-directional data communication using the same bidirectional parallel communication bus is achieved by determining the direction of the bidirectional parallel communication bus before the data being transmitted is latched in the communication port in each of the network control units, and by exclusively enabling or disabling tri-state gates of each communication unit at the same time the data to be transmitted become latched in the output port.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A parallel computer system which receives a mode setting signal indicating a first state or a second state, comprising:

a plurality of processing elements, each having at least four communication ports, east, west, south and north, said plurality of processing elements being arranged in a matrix of rows in the east-west direction and columns in the south-north direction to form a processing element array;

a plurality of bidirectional row communication lines by which each of said plurality of processing elements can transmit and receive data in the east-west direction by using the east and west communication ports;

a plurality of bidirectional column communication lines by which each of said plurality of processing elements can transmit and receive data in the south-north direction by using the north and south communication ports; and communication control means associated with each of said processing elements for allowing bidirectional transmission of data using one of said plurality of bidirectional row communication lines and one of said plurality of bidirectional column communication lines in response to said mode setting signal indicating said first state and allowing unidirectional transmission of data using one of said plurality of bidirectional row communication lines and one of said plurality of bidirectional column communication lines in response to said mode setting signal indicating said second state;

wherein each of the processing elements is individually identified by a processing element identifying number which contains a row number and a column number, and said data includes at least a destination processing element number for identifying a processing element by which said data is to be received, each of said processing elements includes deciding means for deciding whether the destination processing element number included in arriving data and the identifying number of the processing element match, said communication control means including first control means for sending said arriving data as an output from one of said four communication ports using one of said row communication lines and one of said column communication lines in accordance with said mode setting signal indicating said first state and for sending said arriving data as an output either from one of two communication ports in said east-west direction using one of said row communication lines or from one of two communication ports in said south-north direction using one of said column communication lines in accordance with said mode setting signal indicating said second state when the destination processing element number and the processing element identifying number do not match, and wherein said communication control means includes second control means for sending transmission data as an output from one of said four communication ports of a processing element using one of said row communication lines and one of said column communication lines in response to said mode setting signal indicating said first state and in accordance with the destination processing element number within said transmission data and the processing element number of the processing element comprising said communication control means when said transmission data to be transmitted is generated in the processing element, and for sending transmission data as an output either from one of two communication ports of a processing element using one of said row communication lines in said east-west direction or from one of two communication ports of a processing element using one of said column communication lines in said south-north direction in accordance with said mode setting signal indicating said second state.

2. A parallel computer system according to claim 1, wherein said communication control means includes means for taking in said arriving data into a processing element when said destination processing element number and said processing element identifying number match.

3. A parallel computer system according to claim 1, wherein said data further includes a flag for indicating two different states determining whether or not said data should be sent out of said processing element array, and said communication control means includes means for transmitting said data to a processing element identified by said row number and a predetermined column number which is determined independently of said row number of said processing element identifying number when said flag for arriving data or data generated at a processing element is in a first state.

4. A parallel computer system according to claim 3, wherein said communication control means further includes means for transmitting said data to a processing element identified by said row number and said column number when said flag for the arriving data or the data generated at the processing element is in a second state.

5. A parallel computer system according to claim 1, wherein each of said processing elements further comprises execution means for executing programs in accordance with data-flow graphs, and an external data memory, said parallel computer system further comprising save request signal input means for receiving a save request signal from an external source and supplying said save request signal to said processing element, and said processing element includes save means for writing data which exists in said execution means into a predetermined area of said external data memory.

6. A parallel computer system according to claim 5, wherein said execution means includes a pipeline ring comprising a queue memory, and said processing element includes a first writing means for writing data which is to be written into said queue memory into a first area of said external data memory when said queue memory overflows, and a second writing means for writing the data in said first area into said queue memory when said queue memory becomes available to receive data, and said save means writes the data which exists in said execution means into said first area by using said first writing means.

7. A parallel computer system according to claim 6, wherein said save means writes the data which exists in said execution means into a predetermined area of said external data memory regardless of the existence of said save request signal when said first area of said external data memory overflows.

8. A parallel computer system according to claim 7, wherein said save means writes said data into a second area of said external data memory when said first area of said external data memory overflows.

9. A parallel computer according to claim 1, wherein each of said processing elements includes error status signal output means for sending out an error status signal indicative of an occurrence of an internal error within a said processing element, and a wired-OR connection for grouping said error status signals, said parallel computer system further comprising a first signal line for indicating the grouping of the error status signals from respective processing elements by said wired-OR connection and sending data to a location exterior of said processing element array.

10. A parallel computer system according to claim 9, wherein said error status signal is output when an arithmetic error occurs within a processing element.

11. A parallel computer system according to claim 9, wherein said error status signal is output when continued execution of program becomes impossible.

12. A parallel computer system according to claim 9, wherein each of said processing elements includes execution means for executing programs in accordance with data-flow graphs, and said error status signal is output when validity of a result of an arithmetic operation cannot be guaranteed.

13. A parallel computer system according to claim 12, wherein said error status signal is output when continued execution of a program becomes impossible due to an overflow of data in said execution means.

14. A parallel computer system according to claim 9, wherein each of said processing elements includes execution means for executing programs, execution status signal output means for outputting an execution status signal which indicates whether said execution means is busy, and a wired-OR connection for grouping said execution status signals, said parallel computer system further comprising a second signal line for indicating the grouping of the execution status signals from respective processing elements by said wired-OR connection and sending data to a location outside of said processing element array.

15. A parallel computer system according to claim 1, further comprising a first condition signal line for commonly sending a first condition signal as an input to a first group of processing elements; and a second condition signal line for sending a second condition signal as an input to at least one processing element of said first group of processing elements; wherein each of said processing elements includes control signal output means for outputting a predetermined control signal in accordance with said first condition signal and said second condition signal.

16. A parallel computer system according to claim 15, wherein each of said processing elements include a plurality of units, said parallel computer system further comprising a unit selection signal line for commonly sending a unit selection signal as inputs to all processing elements, and said control signal output means includes gate means for setting any one of said plurality of units into a specific state in accordance with said unit selection signal.

17. A parallel computer system according to claim 1, wherein deciding means further decides whether to permit transmission of transmission data before transmitted data arrives at one of said communication ports, and direction determination means for determining a direction of one of said bidirectional parallel communication lines at a time when said transmitted data arrives at said communication port.

18. A parallel computer system which receives a mode setting signal indicating a first state or a second state, comprising:

a plurality of processing elements, each having at least four communication ports, east, west, south and north, said plurality of processing elements being arranged in a matrix of rows in the east-west direction and columns in the south-north direction to form a processing element array;

a plurality of bidirectional row communication lines by which each of said plurality of processing elements can transmit and receive data in the east-west direction by using the east and west communication ports;

a plurality of bidirectional column communication lines by which each of said plurality of processing elements can transmit and receive data in the south-north direction by using the north and south communication ports; and communication control means associated with each of said processing elements for allowing bidirectional transmission of data using one of said plurality of bidirectional row communication lines and one of said plurality of bidirectional column communication lines in response to said mode setting signal indicating said first state and allowing unidirectional transmission of data using one of said plurality of bidirectional row communication lines and one of said plurality of bidirectional column communication lines in response to said mode setting signal indicating said second state;

wherein each processing element is individually identified by a processing element identifying number which includes a row number and a column number, and said data includes a destination processing element number for identifying a processing element which is to receive said data, and a flag for indicating two different states determining whether or not said data should be sent out of said processing element array, said communication control means including means for transmitting said data to a processing element identified by said row number and a predetermined column number which is determined independently of said row number of said processing element identifying number when said flag for arriving data or data generated at a processing element is in a first state;

wherein said communication control means includes means for transmitting said data to a processing element identified by said row number and said column number when said flag for the arriving data or the data generated at the processing element is in a second state, wherein said processing element array comprises a group of processing element and a plurality of such processing element groups are interconnected, each of said processing element groups includes a group interface which is connected to at least one of the processing elements having said predetermined column number of the processing element array, and said parallel computer system further comprising intergroup communication control means for transmitting said data to a processing element group which is identified by a group number which is held in a column number field in which said column number of said data should be held.

19. A parallel computer system which receives a mode setting signal indicating a first state or a second state, comprising:

a plurality of processing elements, each having at least four communication ports, east, west, south and north, said plurality of processing elements being arranged in a matrix of rows in the east-west direction and columns in the south-north direction to form a processing element array;

a plurality of bidirectional row communication lines by which each of said plurality of processing elements can transmit and receive data in the east-west direction by using the east and west communication ports;

a plurality of bidirectional column communication lines by which each of said plurality of processing elements can transmit and receive data in the south-north direction by using the north and south communication ports;

communication control means associated with each of said processing elements for allowing bidirectional transmission of data using one of said plurality of bidirectional row communication lines and one of said plurality of bidirectional column communication lines in response to said mode setting signal indicating said first state and allowing unidirectional transmission of data using one of said plurality of bidirectional row communication lines and one of said plurality of bidirectional column communication lines in response to said mode setting signal indicating said second state;

wherein each of said processing elements includes error status signal output means for sending out an error status signal indicative of an occurrence of an internal error within a said processing element, and a wired-OR connection for grouping said error status signals, said parallel computer system further comprising a first signal line for indicating the grouping of the error status signals from respective processing elements by said wired-OR connection and sending data to a location exterior of said processing element array, wherein each of said processing elements further includes execution means for executing programs, execution status signal output means for outputting an execution status signal which indicates whether said execution means is busy, and a wired-OR connection for grouping said execution status signals, said parallel computer system further comprising a second signal line for indicating the grouping of the execution status signals from respective processing elements by said wired-OR connection and sending data to a location outside of said processing element array;

wherein each of said processing elements includes an execution means for executing programs according to data-flow graphs, said execution means includes a pipeline ring comprising a queue memory, and said execution status signal is output when data exists in said pipeline ring.

20. A parallel computer system which receives a mode setting signal indicating a first state or a second state, comprising:

a plurality of processing elements each having at least four communication ports, east, west, south and north, said plurality of processing elements being arranged in a matrix of rows in the east-west direction and columns in the south-north direction to form a processing element array;

a plurality of bidirectional row communication lines by which each of said plurality of processing elements can transmit and receive data in the east-west direction by using the east and west communication ports;

a plurality of bidirectional column communication lines by which each of said plurality of processing elements can transmit and receive data in the south-north direction by using the north and south communication ports;

communication control means associated with each of said processing elements for allowing bidirectional transmission of data using one of said plurality of bidirectional row communication lines and one of said plurality of bidirectional column communication lines in response to said mode setting signal indicating said first state and allowing unidirectional transmission of data using one of said plurality of bidirectional row communication lines and one of said plurality of bidirectional column communication lines in response to said mode setting signal indicating said second state;

wherein each of said processing elements includes error status signal output means for sending out an error status signal indicative of an occurrence of an internal error within a said processing element and a wired-OR connection for grouping said error status signals, said parallel computer system further comprising a first signal line for indicating the group of the error status signals from respective processing elements by said wired-OR connection and sending data to a location exterior of said processing element array, wherein each of said processing elements includes execution means for executing programs, execution status signal output means for outputting an execution status signal which indicates whether said execution means is busy, and a wired-OR connection for grouping said execution status signals, said parallel computer system further comprising a second signal line for indicating the grouping of the execution status signals from respective processing elements by said wired-OR connection and sending data to a location outside of said processing element array;

wherein each of said processing elements includes a further communication control means for controlling data communication, communication status signal output means for outputting a communication status signal which indicates whether said further communication control means is busy and a wired-OR connection for grouping said communications status signals, said parallel computer system further comprising a third signal line for indicating the grouping of communication status signals from respective processing elements by said wired-OR connection and sending data to a location outside of said processing element array.

21. A parallel computer system according to claim 20, wherein said communication control means includes an input/output buffer for data being input and data to be output, and said communication status signal is output when data exists in said input/output buffer.

22. A parallel computer system which receives a mode setting signal indicating a first state or a second state, comprising:

a plurality of processing elements, each having at least four communication ports east west, south and north said plurality of processing elements being arranged in a matrix of rows in the east-west direction and columns in the south-north direction to form a processing element array;

a plurality of bidirectional row communication lines by which each of said plurality of processing elements can transmit and receive data in the east-west direction by using the east and west communication ports;

a plurality of bidirectional column communication lines by which each of said plurality of processing elements can transmit and receive data in the south-north direction by using the north and south communication ports, wherein said processing elements are arranged in an m×n row-column matrix in said processing element array, communication control means associated with each of said processing elements for allowing bidirectional transmission of data using one of said plurality of bidirectional row communication lines and one of said plurality of bidirectional column communication lines in response to said mode setting signal indicating said first state and allowing unidirectional transmission of data using one of said plurality of bidirectional row communication lines and one of said plurality of bidirectional column communication lines in response to said mode setting signal indicating said second state;

a first condition signal line for commonly sending a first condition signal as an input to a first group of processing elements; and a second condition signal line for sending a second condition signal as an input to at least one processing element of said first group of processing elements;

each of said processing elements includes control signal output means for outputting a predetermined control signal in accordance with said first condition signal and said second condition signal, and wherein said first condition signal line includes m row condition signal lines for commonly sending a row condition signal as inputs to said processing elements in all row directions, said second condition signal line includes n column condition signal lines for commonly sending a column condition signal as inputs to said processing elements in all column directions, and said control signal output means includes gate means for outputting a status setting signal which is used for setting a processing element into a specific state when said row condition signal and said column condition signal, which are obtained at an intersection of said row condition signal line and said column signal line, meet a specific condition.

23. A parallel computer system, comprising:

a plurality of processing elements each having at least four communication ports, east, west, south and north, said plurality of processing elements being arranged in m rows in an east-west direction and in n columns in a south-north direction to form a processing element array of m rows and n columns;

a plurality of row communication lines connecting processing elements in the east-west direction by using the east and west communication ports;

a plurality of column communication lines connecting processing elements in the south-north direction by using the south and north communication ports;

a first condition signal line including m row condition lines for commonly sending a first condition signal as inputs into a first group of processing elements comprised of a part of said plurality of processing elements arranged in row directions; and a second condition signal line including n column condition lines for sending a second condition signal as an input into at least one processing element of said first group of processing elements, said at least one processing element including control signal output means for outputting a specific control signal in accordance with said first condition signal and said second condition signal, and said control signal output means includes gate means for outputting a status setting signal for setting a processing element to a specific state when said row condition signal and said column condition signal, which are obtained at an intersection of said row condition signal line and said column signal line, meet a condition, wherein said processing elements include a plurality of units, said parallel computer system further comprises a unit selection signal line for commonly sending a unit selection signal as an input to all processing elements, and said control signal output means includes gate means for setting any of said plurality of units to a specific state in accordance with said unit selection signal.

24. A parallel computer system as in claim 23 further comprising:

a communication link including a bidirectional parallel communication bus and a communication control line which connects said plurality of processing elements in the east-west direction and the south-north direction;

deciding means for deciding whether bi-directional communication is allowed or not based on a status of said communication control signal line before transmission data arrives at one said communication port; and determining means for determining a direction of said bidirectional parallel communication bus at a time when said transmission data arrives at said one communication port.

25. A parallel computer system as in claim 24 which receives a mode setting signal for a first state or a second state, further comprising:

communication control means which permits bidirectional transmission of data using said bidirectional parallel communication bus in response to the mode setting signal indicating said first state and allows unidirectional transmission of data using said bidirectional parallel communication bus in response to said mode setting signal indicating said second state.

* * * * *